(12) United States Patent
Cheng

(10) Patent No.: US 10,793,325 B2
(45) Date of Patent: Oct. 6, 2020

(54) FOOD STORAGE AND COOKING VESSEL

(71) Applicant: Meyer Intellectual Properties Ltd., Kowloon (HK)

(72) Inventor: Stanley Kin Sui Cheng, Hillsborough, CA (US)

(73) Assignee: Meyer Intellectual Properties Ltd. (VG)

( * ) Notice: Subject to any disclaimer, the term of this patent is extended or adjusted under 35 U.S.C. 154(b) by 0 days.

(21) Appl. No.: 16/385,585

(22) Filed: Apr. 16, 2019

(65) Prior Publication Data

US 2019/0315538 A1  Oct. 17, 2019

Related U.S. Application Data

(60) Provisional application No. 62/658,766, filed on Apr. 17, 2018, provisional application No. 62/757,068, filed on Nov. 7, 2018.

(51) Int. Cl.
*B65D 53/02* (2006.01)
*B65D 51/16* (2006.01)
(Continued)

(52) U.S. Cl.
CPC ..... *B65D 51/1644* (2013.01); *B65D 43/0233* (2013.01); *B65D 81/3453* (2013.01)

(58) Field of Classification Search
CPC ............ B65D 51/1644; B65D 43/0233; B65D 81/3453
(Continued)

(56) References Cited

U.S. PATENT DOCUMENTS 1,635,482 A * 7/1927 Joyce .................... F04B 53/164
                                                       277/642
2,748,975 A * 6/1956 Jacobson ................ A47J 27/08
                                                       220/377
(Continued)

FOREIGN PATENT DOCUMENTS

JP       H02180219 A    7/1990
KR    20120060568 A    6/2012
(Continued)

OTHER PUBLICATIONS

International Search Report dated Aug. 1, 2019 issued in connection with corresponding PCT Application No. PCT/US2019/027647.
(Continued)

*Primary Examiner* — J. Gregory Pickett
*Assistant Examiner* — Niki M Eloshway
(74) *Attorney, Agent, or Firm* — Akerman LLP

(57) ABSTRACT

According to one example, a vessel for one of cooking and storing one or more food items includes a container and a removable lid. The container has a bottom and an upward extending sidewall that terminates in a rim. The lid includes a central portion, and an annular gasket positioned to surround a perimeter of the central portion. The annular gasket includes an upper portion coupling the gasket to the central portion; a vertical portion descending downward from the upper portion; and a flexible skirt extending horizontally outward from an outer side of the vertical portion. The lid further includes an annular lid rim positioned to surround a perimeter of the upper portion of the gasket.

24 Claims, 11 Drawing Sheets

(51) Int. Cl.
*B65D 43/02* (2006.01)
*B65D 81/34* (2006.01)
*A47J 27/00* (2006.01)

(58) Field of Classification Search
USPC .... 220/200, 803, 804, 806, 378, 367.1, 231, 220/573.1, 203.09
See application file for complete search history.

(56) References Cited

U.S. PATENT DOCUMENTS

| | | | | |
|---|---|---|---|---|
| 5,293,813 | A * | 3/1994 | Schultz | A47J 27/0811 |
| | | | | 99/337 |
| 2003/0019878 | A1* | 1/2003 | Scarabelli | B65D 1/22 |
| | | | | 220/796 |
| 2005/0132896 | A1* | 6/2005 | Seurat Guiochet | |
| | | | | A47J 27/0806 |
| | | | | 99/337 |
| 2009/0026205 | A1* | 1/2009 | Moon | B65D 43/022 |
| | | | | 220/367.1 |
| 2010/0147846 | A1* | 6/2010 | Soibel | B65D 43/0212 |
| | | | | 220/202 |
| 2012/0012589 | A1* | 1/2012 | Smyers | B65D 21/0219 |
| | | | | 220/378 |
| 2012/0199582 | A1* | 8/2012 | Cai | B65D 21/0209 |
| | | | | 220/203.04 |
| 2014/0299603 | A1* | 10/2014 | Joy | A47J 36/00 |
| | | | | 220/324 |
| 2016/0003365 | A1* | 1/2016 | Park | F16K 15/148 |
| | | | | 220/212.5 |
| 2016/0332785 | A1* | 11/2016 | Sexton | B65D 45/20 |

FOREIGN PATENT DOCUMENTS

| | | |
|---|---|---|
| KR | 101332512 B1 | 11/2013 |
| WO | 2012/061959 A1 | 5/2012 |
| WO | 2014/077620 A1 | 5/2014 |

OTHER PUBLICATIONS

Written Opinion of the International Searching Authority dated Aug. 1, 2019 issued in connection with corresponding PCT Application No. PCT/US2019/027647.

Office Action dated Nov. 14, 2019 issued in connection with corresponding Taiwan Patent Application No. 108113474.

* cited by examiner

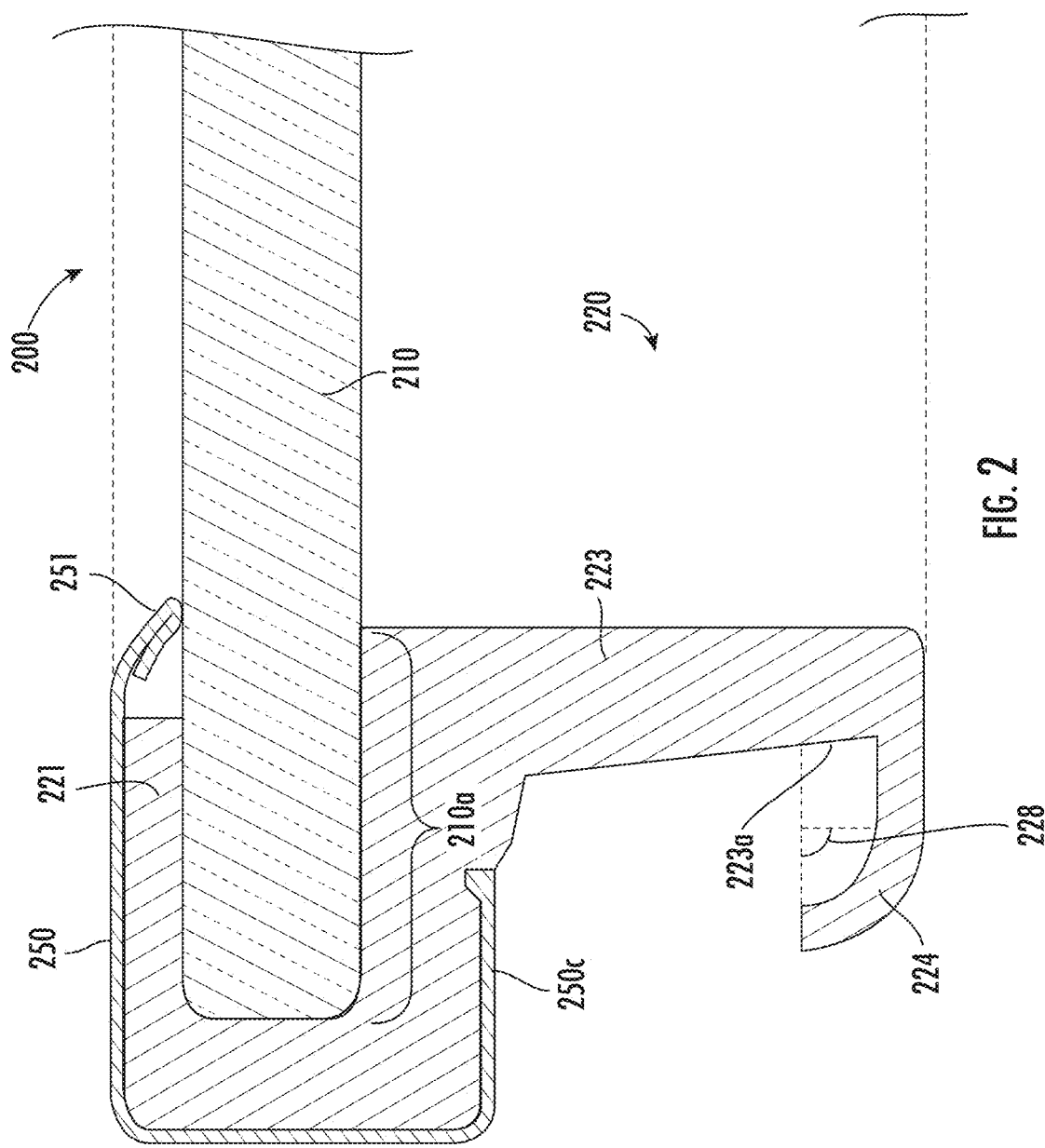

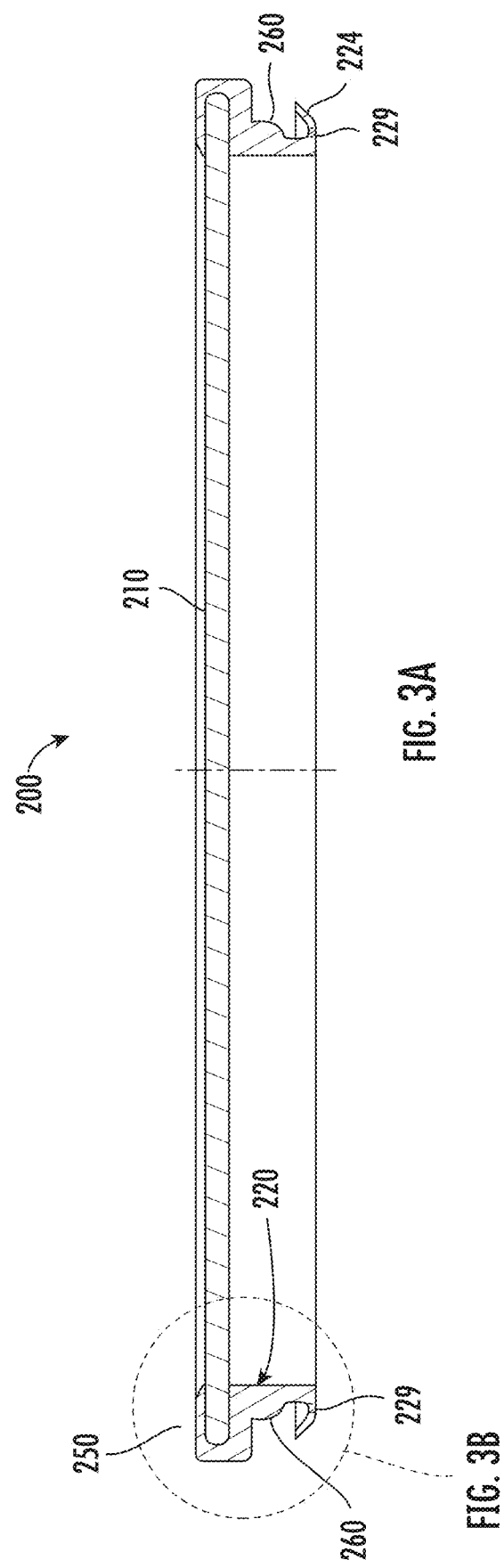

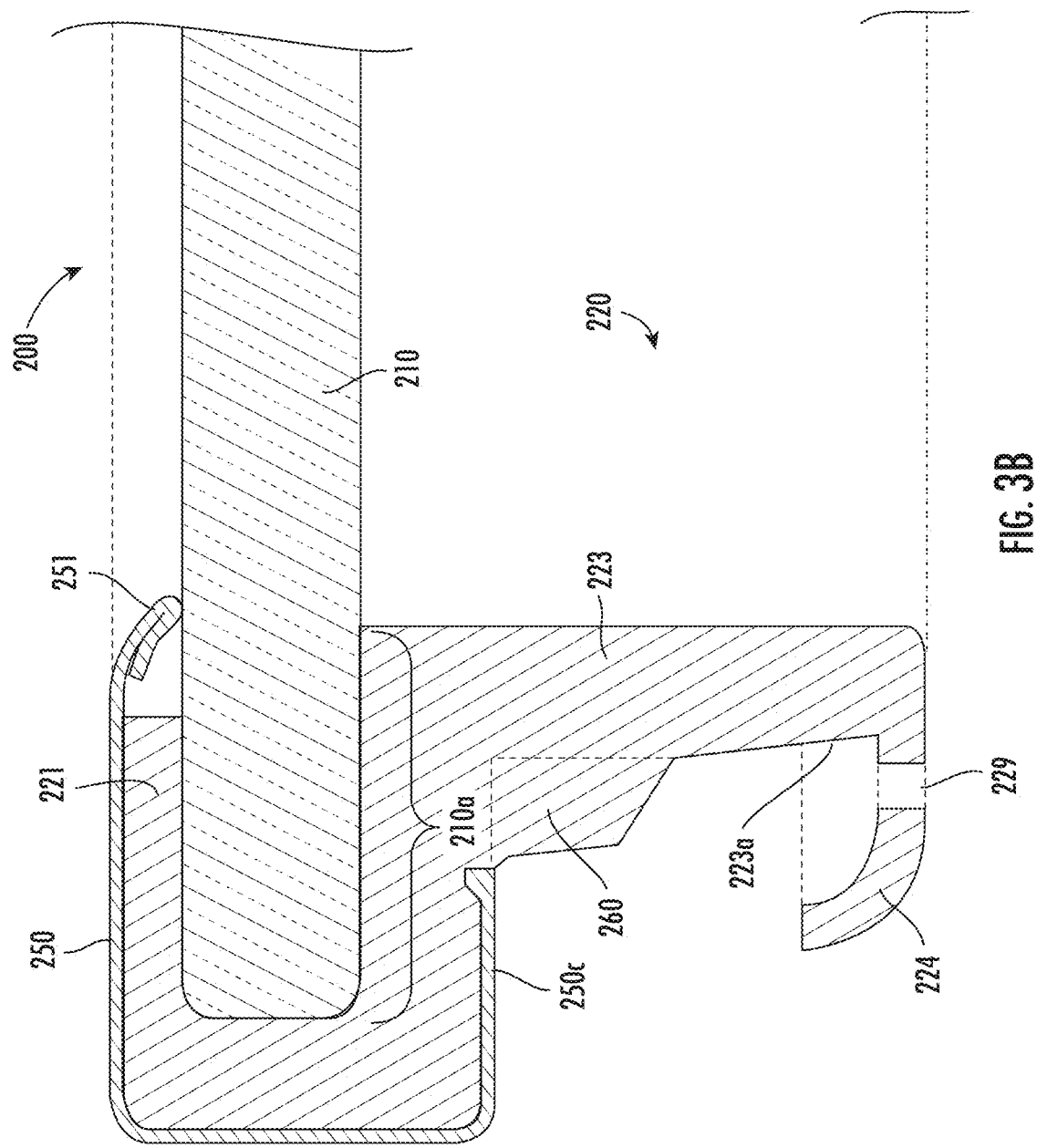

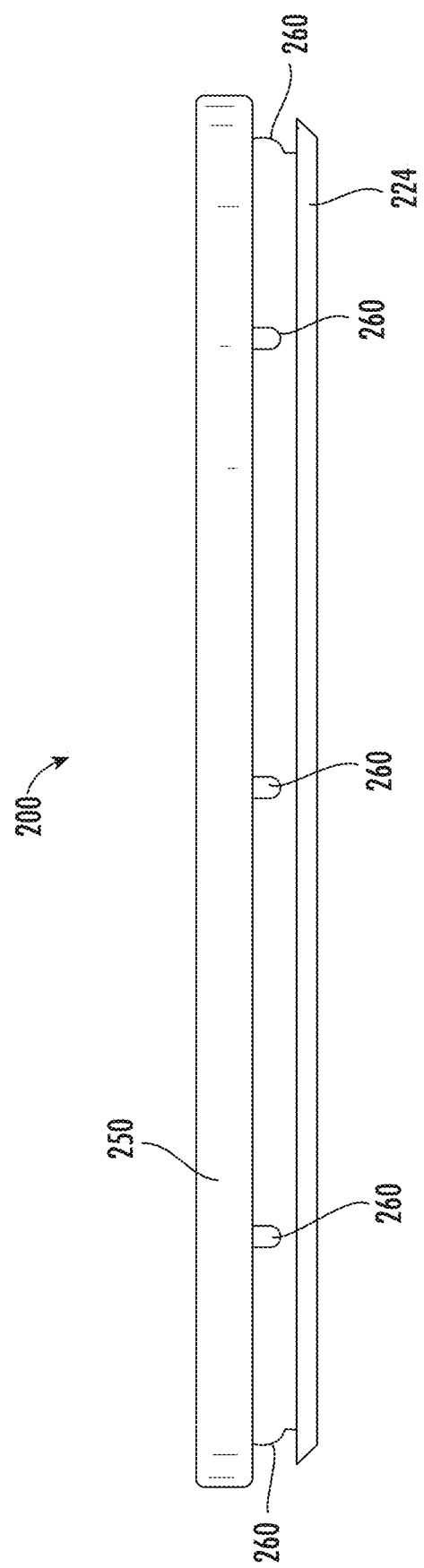

FOOD STORAGE AND COOKING VESSEL

CROSS-REFERENCE TO RELATED APPLICATIONS

This application claims priority to U.S. Provisional Patent Application No. 62/658,766 entitled "Storage Vessel" and filed Apr. 17, 2018, and further claims priority to U.S. Provisional Patent Application No. 62/757,068 entitled "Storage Vessel" and filed Nov. 7, 2018, the entirety of both of which are incorporated herein by reference.

TECHNICAL FIELD

This disclosure relates generally to containers with replaceable lids, and more specifically to a microwavable storage vessel.

BACKGROUND

Typically, food items may be stored in a plastic storage container having a removable lid. These typical storage containers, however, may be deficient.

SUMMARY

In a first example, a storage vessel for one of cooking and storing one or more food items comprises: a container having a bottom and an upward extending sidewall that terminates in a rim that defines an upper opening of the container, the upward extending sidewall having an external surface that defines a horizontally outermost portion of the sidewall, the upward extending sidewall further having an internal surface that defines a horizontally innermost portion of the sidewall; a removable lid for the container, the lid comprising: a central portion having an outer peripheral region; an annular gasket positioned to surround a perimeter of the central portion, the annular gasket comprising: an upper portion coupling the gasket to the central portion, the upper portion including an inner groove for receiving the outer peripheral region of the central portion, wherein the outer peripheral region of the central portion is positioned within the inner groove of the upper portion; a vertical portion descending downward from the upper portion of the gasket, the vertical portion having an outer side that is positioned horizontally inward from an external edge of the upper portion of the gasket; and a flexible skirt extending horizontally outward from the outer side of the vertical portion of the gasket, wherein the flexible skirt is configured to be in contact with the internal surface of the sidewall of the container when the lid is positioned on the rim of the container, wherein the flexible skirt has an upward curvature in an un-deformed state, wherein the flexible skirt is further configured to deform upward and inward from the un-deformed state when the lid is positioned on the rim of the container so as to seal the food storage or cooking vessel; an annular lid rim positioned to surround a perimeter of the upper portion of the gasket, the annular lid rim applying pressure to one or more portions of the upper portion of the gasket, wherein the annular lid rim has an external edge that extends horizontally outward past at least the internal surface of the sidewall while the food storage or cooking vessel is sealed by the lid so as to prevent the annular lid rim from being vertically displaced below the rim; wherein the central portion of the lid has one or more valves configured to selectively allow air to vent out of a fluid retaining interior region of the container while the food storage or cooking vessel is sealed by the lid; and wherein the food storage or cooking vessel is configured to be heated in a microwave oven while the food storage or cooking vessel is sealed by the lid.

In a second example, a food storage or cooking vessel for one or more food items comprises: a container having a bottom and an upward extending sidewall that terminates in a rim that defines an upper opening of the container, the upward extending sidewall having an external surface and an internal surface; and a removable lid for the container, the lid comprising: a central portion having an outer peripheral region; an annular gasket positioned to surround a perimeter of the central portion, the annular gasket comprising: an upper portion coupling the gasket to the central portion; a vertical portion descending downward from the upper portion of the gasket, the vertical portion having an outer side that is positioned horizontally inward from an external edge of the upper portion of the gasket; and a flexible skirt extending horizontally outward from the outer side of the vertical portion of the gasket, wherein the flexible skirt is configured to be in contact with the internal surface of the sidewall of the container when the lid is positioned on the rim of the container, wherein the flexible skirt is further configured to deform upward and inward from an un-deformed state when the lid is positioned on the rim of the container so as to seal the food storage or cooking vessel; an annular lid rim positioned to surround a perimeter of the upper portion of the gasket, wherein the annular lid rim has an external edge that extends horizontally outward past at least the internal surface of the sidewall while the food storage or cooking vessel is sealed by the lid so as to prevent the annular lid rim from being vertically displaced below the rim.

Another example is any such food storage or cooking vessel, wherein the food storage or cooking vessel is configured to be heated in a microwave oven while the food storage or cooking vessel is sealed by the lid. Another example is any such food storage or cooking vessel, wherein the flexible skirt has an upward curvature in the un-deformed state. Another example is any such food storage or cooking vessel, wherein the central portion of the lid has one or more valves configured to selectively allow air to vent out of a fluid retaining interior region of the container while the food storage or cooking vessel is sealed by the lid. Another example is any such food storage or cooking vessel, wherein a portion of the annular gasket is positioned vertically above the rim of the container while the food storage or cooking vessel is sealed by the lid.

Another example is any such food storage or cooking vessel, wherein the external edge of the annular lid rim extends horizontally outward past the external surface of the sidewall when the lid is positioned on the rim of the container. Another example is any such food storage or cooking vessel, wherein the external edge of the upper portion of the gasket extends horizontally outward past the external surface of the sidewall when the lid is positioned on the rim of the container.

Another example is any such food storage or cooking vessel, wherein the annular lid rim is made of metal. Another example is any such food storage or cooking vessel, wherein the container and the central portion of the lid are both made of glass.

Another example is any such food storage or cooking vessel, wherein the upper portion of the gasket includes an inner groove for receiving the outer peripheral region of the central portion, wherein the outer peripheral region of the central portion is positioned within the inner groove of the upper portion. Another example is any such food storage or cooking vessel, wherein the annular lid rim applies pressure to opposing sides of the external edge of the upper portion of the gasket so as to urge the outer peripheral region of the central portion further into position within the inner groove of the upper portion.

Another example is any such food storage or cooking vessel, wherein the annular lid rim is configured to stiffen a portion of the upper portion of the gasket. Another example is any such food storage or cooking vessel, wherein the flexible skirt is further configured to move from the upward and inward deformed position to a downward deformed position when a pressure outside of the food storage or cooking vessel exceeds a pressure inside of the food storage or cooking vessel while the food storage or cooking vessel is sealed by the lid.

Another example is any such food storage or cooking vessel, wherein the flexible skirt further includes one or more perforations configured to allow air to vent out of a fluid retaining interior region of the container while the food storage or cooking vessel is sealed by the lid. Another example is any such food storage or cooking vessel, wherein the container has one or more indentations in the external surface of the sidewall of the container, wherein the one or more indentations extend upward to the rim of the container. Another example is any such food storage or cooking vessel, wherein the one or more indentations comprises a single indentation that extends around the entire perimeter of the external surface of the sidewall of the container.

Another example is any such food storage or cooking vessel, wherein the annular lid rim has a bottom surface with a rounded lower edge, wherein at least a portion of the rounded lower edge extends horizontally outward past the external surface of the sidewall in a location of an indentation within the external surface. Another example is any such food storage or cooking vessel, wherein the gasket has one or more bumpers positioned on at least the outer side of the vertical portion of the gasket, wherein the one or more bumpers each have a horizontally outermost surface that is positioned inward from the external edge of the upper portion of the gasket.

In a third example, a removable lid for a container of a food storage or cooking vessel comprises: a central portion having an outer peripheral region; an annular gasket positioned to surround a perimeter of the central portion, the annular gasket comprising: an upper portion coupling the gasket to the central portion, the upper portion having an inner groove for receiving the outer peripheral region of the central portion, wherein the outer peripheral region of the central portion is positioned within the inner groove of the upper portion; a vertical portion descending downward from the upper portion of the gasket, the vertical portion having an outer side that is positioned horizontally inward from an external edge of the upper portion of the gasket; a flexible skirt extending horizontally outward from the outer side of the vertical portion of the gasket, wherein the flexible skirt is configured to be in contact with an internal surface of a sidewall of the container when the lid is positioned on a rim of the container, wherein the flexible skirt is further configured to deform upward and inward from an un-deformed state when the lid is positioned on the rim of the container so as to seal the food storage or cooking vessel; and an annular lid rim positioned to surround a perimeter of the upper portion of the gasket, wherein the annular lid rim has an external edge that extends horizontally outward past at least the internal surface of the sidewall while the food storage or cooking vessel is sealed by the lid so as to prevent the annular lid rim from being vertically displaced below the rim.

In a fourth example, a method comprises: positioning a food storage or cooking vessel within an interior of a microwave oven, the food storage or cooking vessel comprising: a container having a bottom and an upward extending sidewall that terminates in a rim that defines an upper opening of the container, the upward extending sidewall having an external surface and an internal surface; a removable lid positioned on the lid of the container, the lid comprising: a central portion having an outer peripheral region; an annular gasket positioned to surround a perimeter of the central portion, the annular gasket comprising: an upper portion coupling the gasket to the central portion; a vertical portion descending downward from the upper portion of the gasket, the vertical portion having an outer side that is positioned horizontally inward from an external edge of the upper portion of the gasket; and a flexible skirt extending horizontally outward from the outer side of the vertical portion of the gasket, wherein the flexible skirt is in contact with the internal surface of the sidewall of the container while the lid is positioned on the rim of the container, wherein the flexible skirt has an upward curvature in an un-deformed state, wherein the flexible skirt is deformed upward and inward from the un-deformed state when the lid is positioned on the rim of the container so as to seal the food storage or cooking vessel; and an annular lid rim positioned to surround a perimeter of the upper portion of the gasket, the annular lid rim applying pressure to one or more portions of the upper portion of the gasket, wherein the annular lid rim has an external edge that extends horizontally outward past at least the internal surface of the sidewall while the food storage or cooking vessel is sealed by the lid so as to prevent the annular lid rim from being vertically displaced below the rim; and activating the microwave oven while the food storage or cooking vessel is positioned within the interior of the microwave oven and further while the food storage or cooking vessel is sealed by the lid.

Another example is any such method, further comprising opening one or more valves positioned in the central portion of the lid prior to positioning the food storage or cooking vessel within the interior of the microwave oven.

In a fifth example, a food storage or cooking container has a glass lid secured in an elastomer gasket by a metal rim. A lower portion of the gasket seals with a container inner wall. The lid provides an air tight seal that need not be deliberately opened before heating in a microwave oven, as the shape and holes in the gasket may allow natural venting of hot air and steam.

BRIEF DESCRIPTION OF THE FIGURES

For a more complete understanding of the present disclosure and one or more examples of the features and advantages of the present disclosure, reference is now made to the following description, taken in conjunction with the accompanying drawings, in which:

FIG. 2 is a further enlarged cross-sectional view of the left corner of only the lid of the food storage or cooking vessel of FIG. 1A, when the lid is not positioned on the container.

FIG. 3A is a cross-sectional view of another example of the lid of a food storage or cooking vessel.

FIG. 3B is an enlarged cross-sectional view of the left corner of the lid of FIG. 3A.

FIG. 3C is a side view of the lid of FIG. 3A.

DETAILED DESCRIPTION

Embodiments of the present disclosure are best understood by referring to FIGS. 1A-10D of the drawings, like numerals being used for like and corresponding parts of the various drawings.

Typically, food items (e.g., leftover food items) may be stored in a plastic storage container having a removable lid. These typical storage containers, however, may be deficient. For example, some of these typical storage containers may not be heated in a microwave oven.

In contrast, the food storage or cooking vessel(s) of FIGS. 1A-10D may address one or more of the deficiencies of these typical storage containers. For example, the food storage or cooking vessel(s) of FIGS. 1A-10D may be heated in a microwave oven (even when the food storage or cooking vessel is sealed by a lid). This may, in some examples, prevent a user from having to move food items from a typical storage container to a microwavable dish prior to heating the food items in the microwave oven. As another example, the food storage or cooking vessel(s) of FIGS. 1A-10D may be able to vent during microwave cooking. As another example, the food storage or cooking vessel(s) of FIGS. 1A-10D may allow the food items to be visible through the top or sides of the food storage or cooking vessel, and preferably from both the sides and top of the food storage or cooking vessel. As a further example, the food storage or cooking vessel(s) of FIGS. 1A-10D may be secure (e.g., it may be engagingly sealed), and may not leak or allow food items to fall out when the food storage or cooking vessel is inverted.

Figure 1A:
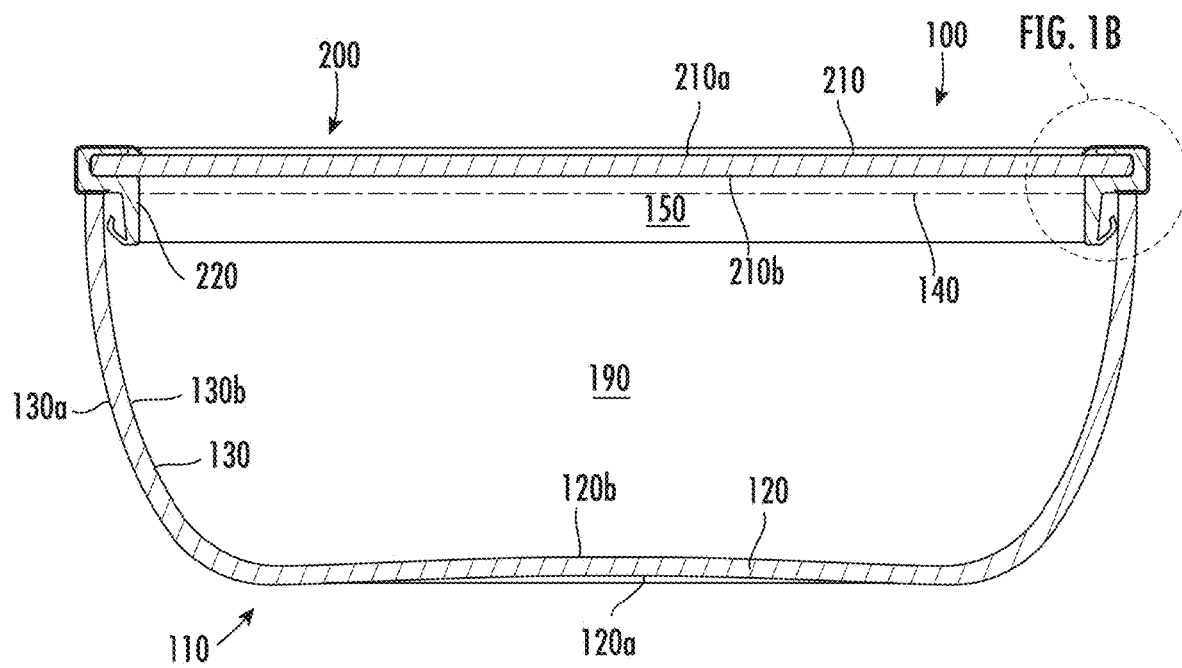
FIG. 1A is a cross-sectional view of an example food storage or cooking vessel having a container and a lid positioned on the container, so as to close the food storage or cooking vessel.

FIGS. 1A-2 illustrate one example of a food storage or cooking vessel 100. As is illustrated, the food storage or cooking vessel 100 comprises a container 110 and a lid 200. The container 110 may be any type of container or vessel for holding, storing, and/or cooking (e.g., heating, cooling, etc.) a food item (e.g., solid food, liquid, etc.). For example, the container 110 may be a glass food storage or cooking container that may store food (such as leftover food), and that may further be used to re-heat the leftover food (e.g., in a microwave oven) while it is still stored in the container 110.

The container 110 includes a bottom 120. The bottom 120 may be the base of the container 110, and may support the container 110 (e.g., hold it upright) when it is positioned on a surface. The bottom 120 may have any shape. For example, an external surface 120a of the bottom 120, an internal surface 120b of the bottom 120, or the entire bottom 120 may be shaped as a circle, an oval, a square, a rectangle, a diamond, an irregular shape, any other shape, or any combination of the preceding. As is illustrated, the entire bottom 120 (and the container 110) is shaped as a circle (e.g., it has circular symmetry). The bottom 120 may further have any size. For example, the bottom 120 may have any length (or diameter), and any thickness.

The bottom 120 may be oriented horizontally when the container 110 is resting on the bottom 120. In some examples, the bottom 120 may be oriented substantially horizontally (e.g., horizontal +/−5 degrees) when the container 110 is resting on the bottom 120. The external surface 120a and/or the internal surface 120b of the bottom 120 may have any degree of curvature and/or angle. For example, one (or both) of external surface 120a and the internal surface 120b may be flat, substantially flat (e.g., flat +/−5 degrees), convex, concave, or have any other degree of curvature and/or angle. As is illustrated, the external surface 120a has a concave shape and the internal surface 120b as a convex shape, causing the bottom 120 to curve upwards from a horizontal plane.

The container 110 further includes an upward extending sidewall 130 that is connected to and surrounds the bottom 120. The sidewall 130 extends upward from the bottom 120 so as to form a fluid retaining interior region 190 of the container 110. The sidewall 130 may extend upward from the bottom 120 at any upward extending angle. For example, the sidewall 130 may extend upward at or substantially at (e.g., +/−5 degrees) 90 degrees, 85 degrees, 80 degrees, 70 degrees, 60 degrees, 45 degrees, 95 degrees, 100 degrees, 110 degrees, 120 degrees, 135 degrees, any other upward extending angle, or any angle (or range of angles) in-between 45 degrees and 135 degrees.

The sidewall 130 may have an external surface 130a that defines a horizontally outermost portion of the sidewall 130, and an internal surface 130b that defines a horizontally innermost portion of the sidewall 130. The external surface 130a and/or internal surface 130b may have any degree of curvature and/or angle. For example, one (or both) of the external surface 130a and the internal surface 130b may be flat, substantially flat (e.g., flat +/−5 degrees), convex, concave, or have any other degree of curvature and/or angle. As another example, one (or both) of the external surface 130a and the internal surface 130b may be curved, such as by having a degree of curvature of or substantially of (e.g., +/−5 degrees) 60 degrees, 55 degrees, 50 degree, 45 degrees, 40 degrees, 35 degrees, 30 degrees, any other degree of curvature, or any degree of curvature (or range of degrees of curvature) in-between 30 degrees and 60 degrees. The sidewall 130 may have any thickness.

The sidewall 130 may extend upward until it terminates at a rim 140 that defines an upper opening 150 of the container 110. This upper opening 150 may allow food to be inserted into and/or removed from the fluid retaining interior region 190 of the container 110. The rim, upper opening 150, or the entire container 110 may be shaped as a circle, an oval, a square, a rectangle, a diamond, an irregular shape, any other shape, or any combination of the preceding. As is illustrated, container 110 is shaped as a circle (e.g., it has circular symmetry). The upper opening 150 may have any size. For example, the upper opening 150 may have any length (or diameter) in-between two opposing portions of the sidewall 130.

The rim 140 of the container 110 may be positioned at any vertical distance from the bottom 120. For example, the rim 140 may be positioned at a vertical distance of or substantially of (e.g., +/−10%) 0.5 inches from the bottom 120, 1 inch from the bottom 120, 2 inches from the bottom 120, 3 inches from the bottom 120, 5 inches from the bottom 120, 6 inches from the bottom 120, 8 inches from the bottom 120, 10 inches from the bottom 120, 12 inches from the bottom 120, 24 inches from the bottom 120, any other vertical distance from the bottom 120, or any vertical distance (or range of vertical distances) in-between 0.5 inches and 24 inches. The external surface 130a of the sidewall 130 may define the horizontally outermost surface of the rim 140, and the internal surface 130b of the sidewall 130 may define the horizontally innermost surface of the rim 140.

The container 110 may be made of any material(s) that may allow a food item to be held, stored, and/or cooked (e.g., heating in a microwave oven, cooled in a refrigerator, etc.) in the container 110. For example, the container 110 may be made of plastic, glass, ceramic glass (e.g., opaque ceramic glass), pottery materials, non-metallic materials, any other material that may allow a food item to be held, stored, and/or cooked in the container 110, or any combination of the preceding. As is illustrated, the container 110 is made of glass. The container 110 made of glass may allow the food storage or cooking vessel 100 to be heated in the microwave (i.e., the food items stored in the food storage or cooking vessel 100 may be heated in the microwave), in some examples. The container 110 made of glass (e.g., transparent glass) may also allow the food items stored in the food storage or cooking vessel 100 to be viewed through the sidewall 130 of the container 110.

As is discussed above, the food storage or cooking vessel 100 further includes a lid 200 that may be used to seal the container 110 and the food storage or cooking vessel 100. This seal may prevent food items from spilling out of the fluid retaining interior region 190 of the container 110. To seal the container 110, the lid 200 may be configured to at least partially extend downward into the fluid retaining interior region 190 of the container 110 (e.g., it may extend downward past the rim 140), and may be further configured to engagingly seal with the internal surface 130b of the sidewall 130 of the container 110. The lid 200 may be removable, allowing the container 110 and food storage or cooking vessel 100 to be unsealed (e.g., for cleaning, to add food items to the food storage or cooking vessel 100).

As is illustrated, the lid 200 includes a central portion 210 that is surrounded by a gasket 220. The central portion 210 may have any shape. For example, an external surface 210a of the central portion 210, an internal surface 210b of the central portion 210, or the entire central portion 210 may be shaped as a circle, an oval, a square, a rectangle, a diamond, an irregular shape, any other shape, or any combination of the preceding. As is illustrated, the central portion 210 (and the entire lid 200) is shaped as a circle (e.g., it has circular symmetry). The central portion 210 may further have any size. For example, the central portion 210 may have any length (or diameter), and any thickness.

The central portion 210 may be oriented horizontally when the lid 200 is positioned on the container 110. In some examples, the central portion 210 may be oriented substantially horizontally (e.g., horizontal +/−5 degrees) when the lid 200 is positioned on the container 110. The external surface 210a and/or the internal surface 210b of the central portion 210 may have any degree of curvature and/or angle. For example, one (or both) of external surface 210a and the internal surface 210b may be flat, substantially flat (e.g., flat +/−5 degrees), convex, concave, or have any other degree of curvature and/or angle. As is illustrated, the external surface 210a and the internal surface 210b are both flat, causing the central portion 210 to be planar.

The central portion 210 may be made of any material(s) that may allow a food item to be held, stored, and/or cooked (e.g., heating in a microwave oven, cooled in a refrigerator, etc.) in the container 110 with the lid 200 on. For example, the central portion 210 may be made of plastic, glass, ceramic glass (e.g., opaque ceramic glass), pottery materials, non-metallic materials, any other material that may allow a food item to be held, stored, and/or cooked in the container 110 with the lid 200 on, or any combination of the preceding. As is illustrated, the central portion 210 is made of glass. The central portion 210 made of glass may allow the food storage or cooking vessel 100 to be heated in the microwave (i.e., the food items stored in the food storage or cooking vessel 100 may be heated in the microwave), in some examples. The central portion 210 made of glass (e.g., transparent glass) may also allow the food items stored in the food storage or cooking vessel 100 to be viewed through the top of the lid 200 of the food storage or cooking vessel 100.

The lid further includes the gasket 220. The gasket 220 may be any device, element, or unit that may seal the junction between the central portion 210 and the internal surface 130b of the sidewall 130, thereby sealing the container 100 and the food storage or cooking vessel 100. The gasket 220 may have any shape and/or size. For example, the gasket 220 may be ring-shaped (i.e., annular), allowing the gasket 220 to surround the central portion 210 along the entire horizontal perimeter of the central portion 210. Furthermore, the annular shape of the gasket 220 is not limited to a circle. Instead, the annular shape may include an annular circle, oval, square, rectangle, diamond, irregular shape, any other shape, or any combination of the preceding. Furthermore, the annular shape may include one or more elliptical segments, curvilinear segments, non-curvilinear segments, a combination of curvilinear and non-curvilinear segments, or any combination of the preceding. This may allow the gasket 220 to fit any shaped container 110, such as an oval container 110 or a container 110 with a straight sides and rounded corners. Notwithstanding the alternative shapes of the gasket 220, the gasket 220 should be shaped in coordination with the shape of the sidewall 130 taking into consideration the stiffness of the gasket sub-components so the gasket outer side 223a flexes to sealingly engage with the internal surface 130b. This flexure range should accommodate possible manufacturing variances of the vessel 100, lid 200 and gasket 220 that irrespective of how the lid 200 is centered with respect to the rim 140, the gasket outer side 223a will still make contact with the internal surface 130b. These variances can be accommodated by the ability of the flexible skirt 224 and the outer side 223a to deform.

The gasket 220 may be made of any material(s) that allows the gasket 220 to seal the junction between the central portion 210 and the internal surface 130b of the sidewall 130, thereby sealing the container 110 and the food storage or cooking vessel 100. For example, the gasket 220 may be made of rubber, a polymer, an elastomer (e.g., silicone, fluorosilicone, etc.), any other material that allows the gasket 220 to seal the junction between the central portion 210 and the internal surface 130b of the sidewall 130 (thereby sealing the food storage or cooking vessel 100), or any combination of the preceding.

Figure 1B:
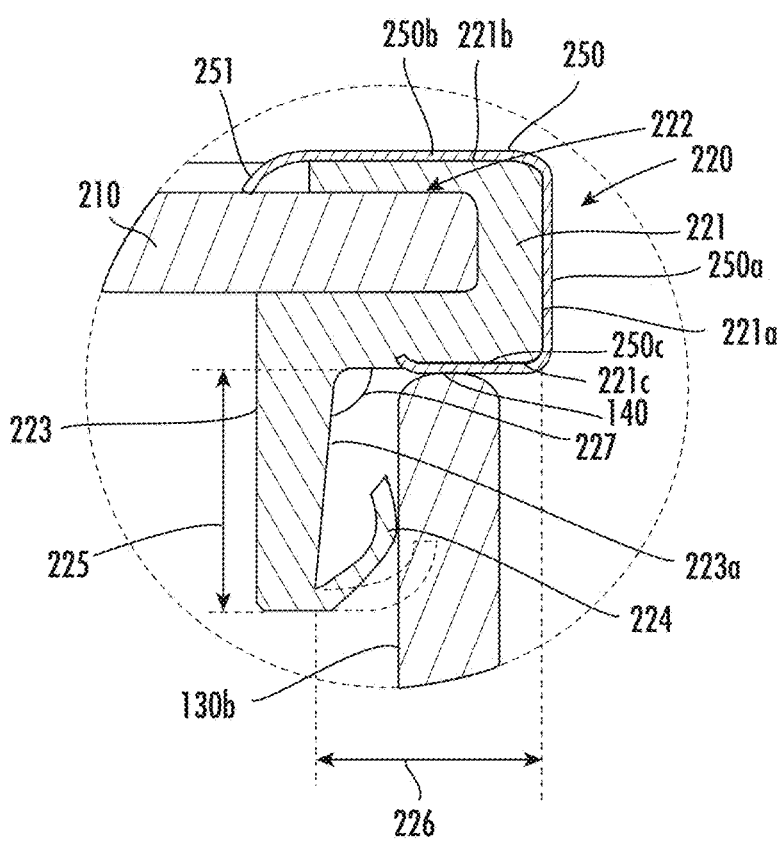
FIG. 1B is an enlarged cross-sectional view of the right corner of the food storage or cooking vessel of FIG. 1A, with the lid positioned on the container.

As is illustrated in FIG. 1B, the gasket 220 includes an upper portion 221, a vertical portion 223, and a flexible skirt 224. The upper portion 221 is configured to couple the gasket 220 to the central portion 210. The upper portion 221 may be configured to couple the gasket 220 to the central portion 210 in any manner. For example, the upper portion 221 may include an adhesive that couples the gasket 220 to the central portion 210. As another example, and as is illustrated, the upper portion 221 may include an inner groove 222 (e.g., an inner circumferential lateral groove) that may receive an outer peripheral region 210a (shown in FIG. 2) of the central portion 210. This inner groove 222 may hold the outer peripheral region 210a, thereby coupling the gasket 220 to the central portion 210. As a further example, the upper portion 221 may include an outer peripheral region that is received into an inner groove in the central portion 210 (i.e., the reverse of the example described above). The upper portion 221 may include an external edge 221a that defines the horizontally outermost portion of the upper portion 221.

The upper portion 221 may have any size and/or shape. For example, the upper portion 221 may have a thickness (or other dimension) that causes the external edge 221a of the upper portion 221 to extend horizontally outward past the internal surface 130b of the sidewall 130. In other examples, the upper portion 221 may have a thickness (or other dimension) that causes the external edge 221a of the upper portion 221 to extend horizontally outward past the external surface 130a of the sidewall 130. By extending horizontally outward past the internal surface 130b and/or the external surface 130b, the size of the upper portion 221 may assist in preventing the gasket 220 (and lid 200) from being pushed entirely within the fluid retaining interior region 190 of the container 110.

The gasket 220 further includes the vertical portion 223. The vertical portion 223 of the gasket 220 descends downward from the upper portion 221 of the gasket 220. The vertical portion 223 may descend downward from the upper portion 221 by a distance 225. The distance 225 may be any length, such as or substantially (e.g., +/−10%) 0.05 inches, 0.1 inches, 0.2 inches, 0.3 inches, 0.5 inches, 0.75 inches, 1 inch, 1.5 inches, 2 inches, 3 inches, any other length, or any length (or range of lengths) in-between 0.05 inches and 3 inches.

The vertical portion 223 includes an outer side 223a that defines the horizontally outermost portion of the vertical portion 223. The outer side 223a of the vertical portion 223 may be positioned inward (or be inset) from the external edge 221a of the upper portion 221 of the gasket 220. This may allow the vertical portion 223 and the flexible skirt 224 to fit within the fluid retaining interior region 190 of the container 110, while the upper portion 221 or a portion of the upper portion 221 remains outside of the fluid retaining interior region 190 of the container 110. Such positioning may allow the gasket 220 to seal the junction between the central portion 210 and the internal surface 130b of the sidewall 130, thereby sealing the food storage or cooking vessel 100. The inward positioning of the vertical portion 223 in relation to the external edge 221a is illustrated as distance 226. The distance 226 may be any length, such as or substantially (e.g., +/−10%) 0.05 inches, 0.1 inches, 0.2 inches, 0.3 inches, 0.5 inches, 0.75 inches, 1 inch, 1.5 inches, any other length, or any length (or range of lengths) in-between 0.05 inches and 1.5 inches.

The vertical portion 223 may descend downward from the upper portion 221 at an angle 227. The angle 227 may be any angle that allows the outer side 223a of the vertical portion 223 to be positioned inward (or be inset) from the external edge 221a of the upper portion 221 of the gasket 220. For example, the angle 227 may be or may be substantially (e.g., +/−10%) 90 degrees, 85 degrees, 80 degrees, 75 degrees, 95 degrees, 100 degrees, 105 degrees, any other angle that allows the outer side 223a to be positioned inward from the external edge 221a, or any angle (or range of angles) in-between 75 degrees and 105 degrees.

As is further illustrated, the gasket 220 also includes the flexible skirt 224. The flexible skirt 224 extends horizontally outward from the external edge 221a of the upper portion 221. This extension causes the flexible skirt 224 to contact (and/or press against) the internal surface 130b of the sidewall 130. This contact allows the gasket 220 (and lid 200) to engagingly seal with the internal surface 130b of the sidewall 130 of the container 110.

The flexible skirt 224 may be configured so that at least a portion of the flexible skirt 224 may flex (or otherwise move) upward and downward. This flexibility may cause this portion of the flexible skirt 224 to be moved upwards by the internal surface 130b of the sidewall 130 of the container 110 (via friction and/or pressure) when the lid 200 is positioned on the container 110 (and the vertical portion 223 and vertical skirt 224 are positioned within the fluid retaining interior region 190 of the container 110). An example of this upward movement is illustrated in FIG. 1B, where the flexible skirt 224 is moved from an un-deformed state (shown in broken lines) to an upward deformed state (shown in solid lines). Furthermore, when the lid 200 is removed from the container 110, the portion of the flexible skirt 224 may move downwards once again to the un-deformed state (shown in broken lines).

The flexible skirt 224 may be configured in any way so as to allow the portion of the flexible skirt 224 to flex (or otherwise move) upward and downward. For example, the flexible skirt 224 may have any thickness (or other dimension) that allows such flexing. As another example, the material(s) of the gasket 220 and the flexible skirt 224 (e.g., a rubber, a polymer, an elastomer, as is discussed above) may allow (or contribute to allowing) such flexing.

The flexible skirt 224 may have any size and/or shape that allows is to contact (and/or press against) the internal surface 130b of the sidewall 130, so as to engagingly seal with the internal surface 130b of the sidewall 130 of the container 110. For example, the flexible skirt 224 may extend horizontally outward in a horizontal plane (i.e., it may be flat) in its un-deformed state. As a preferable example, the flexible skirt 224 may have an upward curvature in its un-deformed state. This upward curvature (shown in the broken lines in FIG. 1B) provides an inherent tendency to further curl upward (shown in the solid lines in FIG. 1B) as it contacts the internal surface 130bof the sidewall 130 of the container 110. As another example, the flexible skirt 224 may have a downward curvature in its un-deformed state. Further details regarding example shapes of the flexible skirt 224 are illustrated in FIGS. 10A-10D.

In its un-deformed state (shown in the broken lines in FIG. 1B), the flexible skirt 224 may curve upwards or downwards by any amount that allows it to contact (and/or press against) the internal surface 130b of the sidewall 130. For example, the curve may create an arc that has a central angle 228 (shown in FIG. 2) of or of substantially (e.g., +/−10%) 45 degrees, 50 degrees, 60 degrees, 70 degrees, 75 degrees, 80 degrees, 90 degrees, 100 degrees, 110 degrees, 120 degrees 130 degrees, 135 degrees, 140 degrees, 150 degrees, any other angle that allows the flexible skirt 224 to contact (and/or press against) the internal surface 130b of the sidewall 130, or any angle (or range of angles) in-between 45 degrees and 150 degrees.

The lid 200 further includes a lid rim 250. The lid rim 250 may be any device, element, or unit that may be coupled to the gasket 220 and/or the central portion 210 to as to provide an outer surface or edge to the gasket 220, central portion 210, and/or the lid 200. As is illustrated in FIG. 1B, the lid rim 250 may extend around the upper portion 221 of the gasket 220. For example, a top surface 250b of the lid rim 250 may be positioned on a top surface 221b of the upper portion 221, a bottom surface 250c of the lid rim 250 may be positioned on a bottom surface 221c of the upper portion 221, and an external edge 250a of the lid rim 250 may be poisoned on the external edge 221a of the upper portion 221. This may cause the lid rim 250 to surround all or a portion of the exterior surface of the upper portion 221 of the gasket 220. The external edge 250a of the lid rim 250 may define the horizontally outermost portion of the lid rim 250.

The lid rim 250 may apply pressure to portions of the lid 200. For example, the lid rim 250 may apply a substantially downward pressure on the top surface 221b of the upper portion 221 (and further on a top side of the outer peripheral region 210a of the central portion 210), and may further apply a substantially upward pressure on the bottom surface 221c of the upper portion 221 (and further on a bottom side of the outer peripheral region 210a of the central portion 210), in some examples. This may assist in coupling the gasket 220 to the central portion 210 by, for example, further squeezing or clamping the upper portion 221 (and the inner groove 222 in the upper portion 221) onto the outer peripheral region 210a of the central portion 210. As another example, the lid rim 250 may apply a substantially horizontal pressure on the external edge 221a of the upper portion 221 of the gasket 220, so as to squeeze (or otherwise apply pressure to) opposing sides of the external edge 221a together (e.g., and squeeze them against the central portion 210 positioned in-between the opposing sides). This may urge the inner groove 222 in the upper portion 221 into a further sealed engagement with the outer peripheral region 210a of the central portion 210 (and/or vice versa, by urging outer peripheral region 210a of the central portion 210 into a further sealed engagement with the inner groove 222 in the upper portion 221). For example, it may urge the outer peripheral region 210a of the central portion 210 further into position within the inner groove 222 of the upper portion 211 (e.g., by further pressing the outermost horizontal edge of the inner groove 222 against the outside perimeter of the outer peripheral region 210a of the central portion 210), The lid rim 250 may provide support to the gasket 220, in some examples. For example, the lid rim 250 may stiffen the material(s) of the gasket 220 in the proximity of the lid rim 250. As an example of this, the lid rim 250 may squeeze portions of the upper portion 221, causing the upper portion 221 to stiffen (as it is bunched together by the lid rim 250). This may allow the gasket 220 to be made of a very soft and pliable material (to enhance the deformability of the flexible skirt 224), while also allowing the upper portion 221 to be sufficiently hard and less pliable so as to prevent the gasket 220 (and the lid 200) from being pushed entirely within the fluid retaining interior region 190 of the container 110 when the lid 200 is positioned tightly on the container 110.

The lid rim 250 may be made of any material(s) that may allow the food storage or cooking vessel 100 to be used to hold, store, and/or cook a food item. For example, the lid rim 250 may be made of any material(s) that may allow the food storage or cooking vessel 100 to be positioned within a microwave oven while the microwave oven is heating the food item held in the container 110 of the food storage or cooking vessel 100. As an example of this, the lid rim 250 may be made of plastic, glass, pottery materials, non-metallic materials, metallic materials, any other material that may allow the food storage or cooking vessel 100 to be used to hold, store, and/or cook a food item, or any combination of the preceding. In a preferable example, the lid rim 250 is made of metal or stainless steel. The use of a lid rim 250 being made of a thin curved metal sheet (or other metal member) may allow the food storage or cooking vessel 100 to be heated in the microwave oven, as it may prevent arcing in a microwave oven, in some examples.

Furthermore, in a preferable example, the material of the lid rim 250 may be a smooth material, such as metal. As such, when the gasket 220 is in contact with the internal surface 130b of the sidewall 130 (thereby providing a seal), the contact of the smooth material (e.g., metal) of the bottom surface 250c of the lid rim 250 with the rim 140 of the container 110 (e.g., made of glass) may provide additional sealing, in some examples. Furthermore, it may also render the sealed food storage or cooking vessel 100 generally air tight for the food storage or cooking of foods in cabinets or in refrigerators.

The lid rim 250 may have any size and/or shape. For example, as is discussed above, the lid rim 250 may be a thin sheet of metal that may, in some examples, be sized to surround all or a portion of the exterior surface of the upper portion 221 of the gasket 220. In some examples, the lid rim 250 may have a thickness (or other dimension) that causes the external edge 250a of the lid rim 250 to extend horizontally outward past the internal surface 130b of the sidewall 130. In other examples, the lid rim 250 may have a thickness (or other dimension) that causes the external edge 250a of the lid rim 250 to extend horizontally outward past the external surface 130a of the sidewall 130. By extending horizontally outward past the internal surface 130b and/or the external surface 130a, the size of the lid rim 250 may assist in preventing the gasket 220 (and lid 200) from being pushed entirely within the fluid retaining interior region 190 of the container 110. Hence, when the lid 200 is placed in the opening 150 to close or seal the container 110 and food storage or cooking vessel 100, the lid rim 250 may extend beyond the first rim 140 to limit the vertical displacement of the gasket 220 into the upper opening 150 such that the flexible skirt 224 sealingly engages the internal surface 130b of the sidewall 130. This limit on vertical displacement of the gasket 220 may cause a portion of the gasket 220 (e.g., the upper portion 221, a portion of the upper portion 221) to remain vertically above the rim 140 of the container 110 even when the lid 200 is sealing the food storage or cooking vessel 100.

The lid rim 250 may be ring-shaped (i.e., annular), allowing the lid rim 250 to surround the upper portion 221 of the gasket 220 along the entire horizontal perimeter (i.e., the entire external edge 221a of the upper portion 221 of the gasket 220). Furthermore, the annular shape of the lid rim 250 is not limited to a circle. Instead, the annular shape may include an annular circle, oval, square, rectangle, diamond, irregular shape, any other shape, or any combination of the preceding. Furthermore, the annular shape may include one or more elliptical segments, curvilinear segments, non-curvilinear segments, a combination of curvilinear and non-curvilinear segments, or any combination of the preceding. This may allow the lid rim 250 to fit any shaped gasket 220 and container 110, such as an oval gasket 220 and container 110 or a gasket 220 and container 110 with a straight sides and rounded corners. As is illustrated, the lid rim 250, the gasket 220, the central portion 210, the lid 200, and the container 110 are shaped as a circle. Notwithstanding the alternative shapes of the lid 200 and lid rim 250, when the lid rim 250 is made of metal and the container 110 is intended for use in a microwave oven, the lid rim 250 should not have any sharp corners, but should have a radius of curvature greater than several millimeters, but more preferably at least a centimeter or several centimeters.

The lid rim 250 may include an upper inner periphery 251 that extends horizontally inward past the top surface 221b of the upper portion 221 (towards the central portion 210), and that also extends downward so as to contact the central portion 210. This may minimize the potential for entry of contamination in the inner groove 222 of the gasket 220, in some examples. In a preferable example, the upper inner periphery 251 is folded over itself, as is illustrated in FIGS. 1B and 2. This may cause the curved portion of the fold to be in contact with the central portion 210, in some examples.

Modifications, additions, and/or substitutions may be made to the food storage or cooking vessel 100 of FIGS. 1A-2 without departing from the scope of the specification. For example, although the lid 200 of the food storage or cooking vessel 100 is described above as including a lid rim 250, in some examples, the lid 200 may not include a lid rim 250.

FIGS. 3A-3C illustrate another example of the lid 200 of the food storage or cooking vessel 100. The lid 200 of FIGS. 3A-3C may be substantially similar to the lid 200 of FIGS. 1A-2. However, the gasket 220 of the lid 200 of FIGS. 3A-3C may further include one or more bumpers 260 and one or more apertures 229. Also, the lid 200 of FIGS. 3A-3B may be positioned on (or otherwise used with) a container 110 that is substantially similar to the container 110 of FIGS. 1A-2.

As is illustrated, the gasket 220 may include one or more bumpers 260. The bumper 260 may assist in centering the lid 200 on the container 110. For example, as the lid 200 is being positioned on the container 110, the bumper(s) 260 may bump or rub against the internal surface 130b of the sidewall 130 of the container 110. This bumping or rubbing of the bumpers 260 on opposing sides the internal surface 130b of the sidewall 130 may signify to the user that the lid 200 is properly centered on the container 110. As such, using guidance provided by the bumpers 260, the user may be able to more easily move the lid 200 downward with the central portion 210 in a plane that is parallel to the plan defined by the rim 140.

In some examples, the bumper(s) 260 may be helpful because the flexible skirt 224's flexible nature may prevent it from properly signaling to the user that the lid 200 is properly centered on the container 110. Instead, without the bumpers 260, the user may have improperly positioned the lid 200 in a location that causes a first portion of the flexible skirt 224 to be too close to the internal surface 130b, while an opposing portion of the flexible skirt 224 is too far from the internal surface 130b (thereby providing an ineffective seal).

The bumper 260 may be any structure positioned on the gasket 220 that may assist in centering the lid 200 on the container 110. For example, the bumper 260 may be bump (or other piece of material) in the profile of the gasket 220, a lip protruding downward from the upper portion 221 of the gasket 220, any other structure positioned on the gasket 220 that may assist in centering the lid 200 on the container 110, or any combination of the preceding. As is illustrated, the bump 260 is a bump (or other piece of material) in the profile of the gasket 220.

The bumper 260 may be positioned on any portion of the gasket 220 that allows it to assist in centering the lid 200 on the container 110. For example, the bumper 260 may be positioned on the upper portion 221 of the gasket 220 (e.g., as a lip that extends downward from the bottom surface 221c of the upper portion 221), positioned on the vertical portion 223 of the gasket 220 (e.g., a bump that extends horizontally outward from the outer side 223a of the vertical portion 223), positioned on both the upper portion 221 and the vertical portion 223 of the gasket 220 (e.g., a bump that extends downward from the bottom surface 221c and that further extends horizontally outward from the outer side 223a of the vertical portion 223, as is illustrated in FIGS. 3A-3C), positioned on any other portion of the gasket 220 that allows the bumper 260 to assist in centering the lid 200 on the container 110, or any combination of the preceding.

The bumper 260 may have any size and/or shape (and/or positioning) that allows it to assist in centering the lid 200 on the container 110. For example, the bumper 260 may be sized so that its horizontally outermost surface is located inward (or is inset) from the external edge 221a of the upper portion 221 of the gasket 220. This location of the horizontally outermost surface may allow the bumper 260 to fit within the fluid retaining interior region 190 of the container 110, while the upper portion 221 or a portion of the upper portion 221 remains outside of the fluid retaining interior region 190 of the container 110.

As another example, the bumper 260 may be sized so that its horizontally outermost surface is located inward (or is inset) from the horizontally outermost portion of the flexible skirt 224. This may allow the bumper 260 to assist in centering the lid 200 on the container 110, without the bumper 260 being configured to flex upward and downward (as the lid 200 is positioned on the container 110). As another example, the bumper 260 may be sized so that (when the lid 200 is positioned on the container 100) the bumper 260's horizontally outermost surface is located at or slightly inward of the internal surface 130b of the sidewall 130. In some examples, the horizontal distance between the horizontally outermost surface of the bumper 260 and the internal surface 130b of the sidewall (when the lid 200 is positioned on the container 110 to seal the food storage or cooking vessel 100) may be or may be substantially (e.g., +/−10%), for example, 0 millimeters, 0.1 millimeters, 0.25 millimeters, 0.5 millimeters, 1 millimeter, 1.5 millimeters, 2 millimeters, any other distance that allows the bumper 260 to assist in centering the lid 200 on the container 110, or any distance (or range of distances) in-between 0 millimeters and 2 millimeters.

The gasket 220 may include any number of bumpers 260. For example, the gasket 220 may include 2 or more bumpers 260, but preferably to 4 to 6 bumpers 260. It may be desirable to have more than 6 bumpers depending on the circumference of the lid and rim, but a uniform radial spacing of between 30 to 90 degrees between bumpers 260 is sufficient to aid in centering, without unduly increasing molding complexity and the chance for manufacturing imperfections. The bumpers 260 may be spaced apart (e.g., radially spaced apart) from each other along the gasket 220. For example, each bumper 260 may be spaced apart from any other bumper 260 along the outside perimeter of the gasket 220 (e.g., along the perimeter created by the external edge 221a of the upper portion 221) by or substantially by (e.g., +/−10%) 0.25 inches, 0.5 inches, 1 inch, 1.5 inches, 2 inches, 3 inches, 5 inches, or any distance (or range of distances) in-between 0.25 inches and 5 inches.

As is also illustrated, the gasket 220 may include one or more apertures 229. The aperture(s) 229 may allow air to vent out of the fluid retaining interior region 190 of the container 110 when the lid 200 is sealing the container 110 and the food storage or cooking vessel 100. For example, the aperture(s) 229 may vent air out of the container 110 through one or more locations positioned in-between the vertical portion 223 of the gasket 220 and the internal surface 130b of the sidewall. This may allow the food storage or cooking vessel 100 to be more securely sealed because the venting may prevent air from being trapped and compressed in the fluid retaining interior region 190 during the lid closing process. This may be helpful, as compressed air in the fluid retaining interior region 190 could urge the lid 200 upward and could slowly defeat the sealing provide by the gasket 220, in some examples.

Furthermore, when the food storage or cooking vessel 100 is heated in a microwave oven, the steam and/or hot air generated may gradually vent through the aperture(s) 229 (and may vent to and/or through the location where the lid rim 250 contacts the rim 140 of the container 110). This venting of the steam and/or hot air may prevent the lid 200 from being explosively ejected from the top of the container 110, in some examples.

The aperture 229 may be any venting structure positioned on the gasket 220 that may allow air to vent out of the fluid retaining interior region 190 when the lid 200 is positioned on the container 110 (thereby sealing the food storage or cooking vessel 100). For example, as is illustrated, the aperture 229 may be a hole (or other aperture) in the gasket 220.

The aperture 229 may be positioned on any portion of the gasket 220 that allows it to allow air to vent out of the fluid retaining interior region 190 of the container 110 when the lid 200 is sealing the food storage or cooking vessel 100. For example, the aperture 229 may be positioned in the vertical portion 223, in the flexible skirt 224, any other portion of the gasket 220 that allows it to allow air to vent out of the fluid retaining interior region 190 of the container 110 when the lid 200 is sealing the food storage or cooking vessel 100, or any combination of the preceding. As is illustrated, the aperture 229 is positioned in the flexible skirt 224. In some examples, the aperture 229 may be positioned in the flexible skirt 224 in a location adjacent (e.g., within or substantially within 0.5 inches, 0.3 inches, 0.1 inches, 2 millimeters) of the location where the flexible skirt 224 connects to the outer side 223a of the vertical portion 223. Such positioning may prevent the aperture 229 from being blocked or obstructed by the flexible skirt 224 when it is moved upward by the internal surface 130b of the sidewall 130.

The aperture 229 may have any size and/or shape for allowing air to vent out of the fluid retaining interior region 190 of the container 110 when the lid 200 is sealing the food storage or cooking vessel 100. For example, the aperture 229 may be shaped as a circle, an oval, a square, a rectangle, a diamond, an irregular shape, any other shape, or any combination of the preceding. As another example, the aperture 229 may have a diameter of or substantially (e.g., +/−10%) 1 millimeter to generally less than about 5 millimeters. The larger the apertures 229, the more easily fluid can leak through them. While no physical apertures can be fluid tight, capillary forces minimize fluid leakage when the apertures are smaller rather than larger.

The aperture 229 may be formed in any manner on the gasket 220 for allowing air to vent out of the fluid retaining interior region 190 of the container 110 when the lid 200 is sealing the food storage or cooking vessel 100. For example, the aperture 229 may be formed integral with the gasket 220. In such an example, a mold used to form the gasket 220 may include protrusions that also form the aperture(s) 229. As another example, the aperture 229 may be formed subsequent to the forming of the gasket 200. In such an example, the apertures 229 may be poked through the thickness in the gasket 200 by, for example, a machine.

The gasket 220 may include any number of apertures 229. For example, the gasket 220 may preferably include from about 2 to 8 apertures 229, but more or less apertures 229 can be deployed depending on aperture size so that steam or hot air can flow outward during microwave cooking to minimize the build of internal pressure. If the apertures 229 can be reproducibly made smaller than 1 mm, many more can be used, with the intent to provide the same effective cross section for hot gas or steam to escape. Other embodiments discussed further on do not require apertures 229. The apertures 229 may be spaced apart (e.g., tangentially spaced apart) from each other along the gasket 220. For example, each aperture 229 may be spaced apart from any other aperture 229 along the perimeter created by the flexible skirt 224 by or substantially by (e.g., +/−10%) 1 millimeter, 2 millimeters, 0.1 inch, 0.25 inches, 0.5 inches, 1 inch, 1.5 inches, 2 inches, 3 inches, 5 inches, or any distance (or range of distances) in-between 1 millimeter and 5 inches.

Modifications, additions, and/or substitutions may be made to the lid 200 of FIGS. 3A-3C without departing from the scope of the specification. For example, although the lid 200 is described above as including both bumper(s) 260 and aperture(s) 229, the lid 200 may include only bumper(s) 260, only aperture(s) 229, or neither bumper(s) 260 nor aperture(s) 229.

Figure 4A:
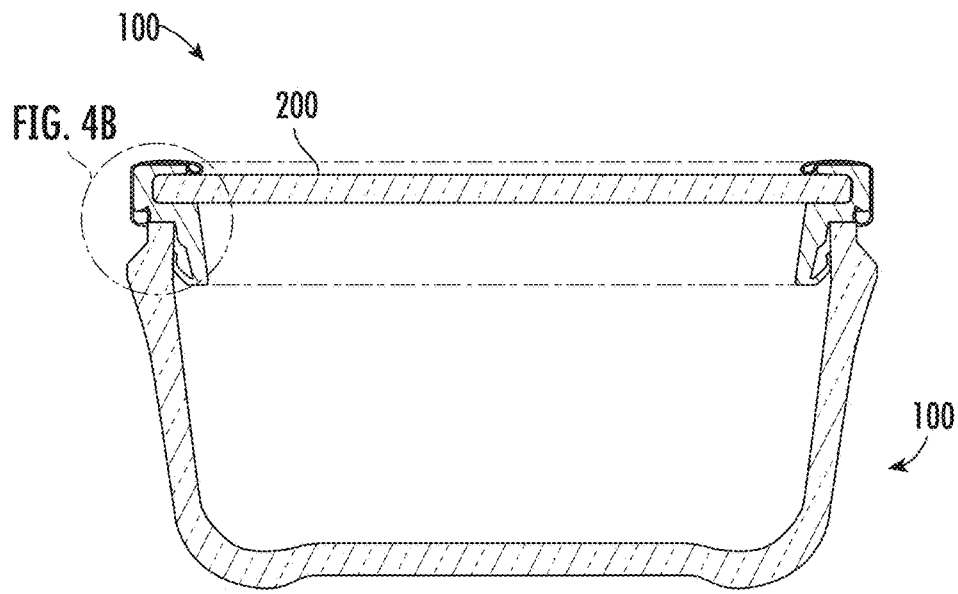
FIG. 4A is a cross-sectional view of another example of the lid and container of a food storage or cooking vessel.
Figure 4B:
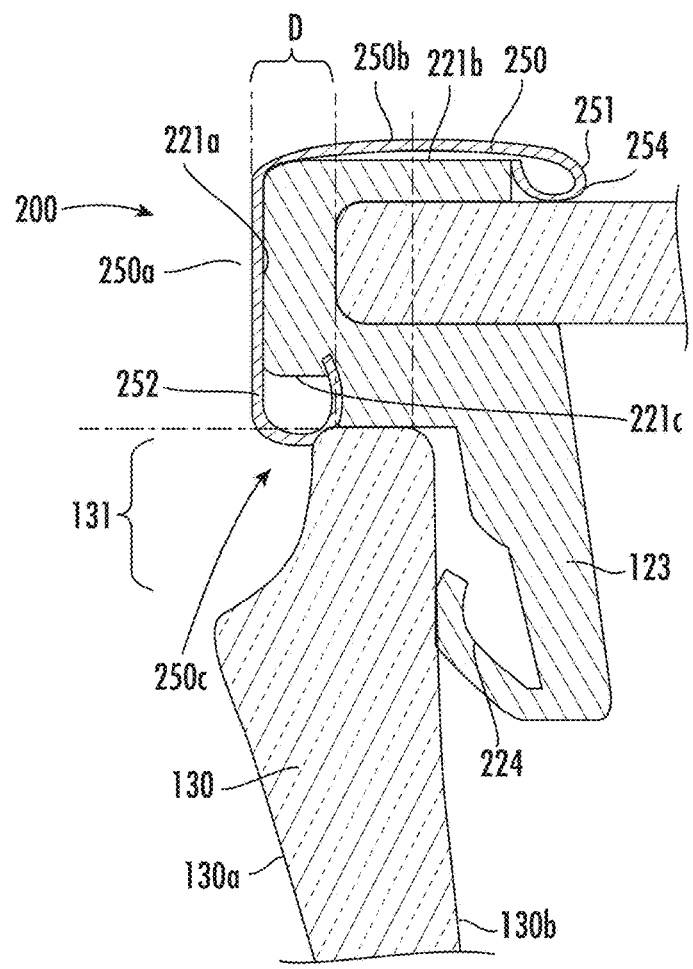
FIG. 4B is an enlarged cross-sectional view of the left corner of the food storage or cooking vessel of FIG. 4A.

FIGS. 4A-4B illustrate another example of the container 110 and the lid 200 of the food storage or cooking vessel 100. The container 110 of FIGS. 4A-4B may be substantially similar to the container 110 of FIGS. 1A-2 and/or FIGS. 3A-3C. However, the container 110 of FIGS. 4A-4B may further include one or more indentations 131. The lid 200 of FIGS. 4A-4B may be substantially similar to the lid 200 of FIGS. 1A-2 and/or FIGS. 3A-3C. However, the lid rim 250 of the lid 200 may have a different shape. This shape of the lid rim 250 and the indentation(s) 131 may facilitate the removal of the lid 200 from the container 110.

As is illustrated, the external surface 130a of the sidewall 130 of the container 110 may include one or more indentations 131 that extend upward to the rim 140 of the container 110. The indentation(s) 131 may provide a space into which a user may insert one or more fingers (or fingertips or other objects), so that the fingers (or other objects) may be positioned underneath a portion of the lid rim 250. This positioning may allow the user to more easily urge the lid frame 250 upward and more easily release the gasket 220 from its sealed engagement with the internal surface 130b of the sidewall 130 of the container 110, thereby opening the food storage or cooking vessel 100. The contents of the container 110 may then be poured out of (or otherwise removed) from the container 110 through the upper opening 150.

The indentation 131 may have any size and/or shape (and/or positioning) that provides a space into which a user may insert one or more fingers (or fingertips or other objects). For example, the indentation 131 may have a depth that causes the external edge 250a of the lid rim 250 to extend horizontally outward past the external surface 130a (with the indentation 131) of the sidewall 130 by or substantially by (e.g., +/−10%) 2 millimeters, 0.1 inch, 0.2 inches, 0.25 inches, 0.3 inches, 0.4 inches, 0.5 inches, 0.6 inches, 0.75 inches, 0.8 inches, 0.9 inches, 1 inch, 1.5 inches, or any distance (or range of distances) in-between 2 millimeters and 1.5 inches. As another example, the indentation 131 may have a width (or length) along the perimeter of the external surface 130a that allows one or more fingers (e.g., one finger, two fingers, four fingers) to fit in the indentation 131. As an example of this, the indentation 131 may have a width (or length) along the perimeter of the external surface 130a of or substantially of (e.g., +/−10%) 0.5 inches, 1 inch, 1.5 inches, 2 inches, 2.5 inches, 3 inches, 3.5 inches, 4 inches, 5 inches, the entire perimeter of the external surface 130a, or any distance (or range of distances) in-between 0.5 inches and the entire perimeter of the external surface 130a. As is illustrated, the external surface 130a of FIGS. 4A-4B includes a single indentation 131 that extends around the entire perimeter of the external surface 130a (i.e., it has a width equal to the entire perimeter of the external surface 130a).

The external surface 130a may include any number of indentations 131. For example, the external surface 130a may include 1 indentation 131, 2 indentations 131, 3 indentations 131, 4 indentations 131, 8 indentations 131, 10 indentations 131, 20 indentations 131, any other number of indentations 131, or any number of indentations 131 (or range of indentations 131) in-between 1 indentation 131 and 20 indentations 131. As is illustrated, the external surface 130a of FIGS. 4A-4B includes a single indentation 131 that extends around the entire perimeter of the external surface 130a.

When the external surface 130a includes multiple indentations 131 (e.g., four indentations 131, with one indentation 131 on each side of a square container 110), the indentations 131 may be spaced apart from each other along the external surface 130a. For example, each indentation 131 may be spaced apart from any other indentations 131 along the perimeter of the external surface 130a by or substantially by (e.g., +/−10%) 0.5 inches, 1 inch, 2 inches, 3 inches, 4 inches, 5 inches, 6 inches, 10 inches, or any distance (or range of distances) in-between 0.5 inches and 10 inches. In some examples, the external surface 130a may include one or more indentations 131 per side of the container 110. For example, if the container 110 is square (or substantially square), the external surface 130a may include a single indentation 131 per side of the square (for a total of 4 indentations 131). These indentations 131 may be positioned in the center (or middle) of each side, for example.

As is discussed above, the lid rim 250 of FIGS. 4A-4B may have a different shape than the lid rim 250 of FIGS. 1A-3. As is illustrated, the lid rim 250 (e.g., a thin ring-shaped sheet of metal) may include the external edge 250a positioned on (or over) the external edge 221a of the upper portion 221 of the gasket 220, the top surface 250b positioned on (or over) the top surface 221b of the upper portion 221 of the gasket 220, and the bottom surface 250c positioned on (or over) the bottom surface 221c of the upper portion 221 of the gasket 220. This may cause the lid rim 250 to surround all or a portion of the exterior surface of the upper portion 221 of the gasket 220.

Similar to the lid frame 250 of FIGS. 1A-3, the top surface 250b of the lid frame 250 of FIGS. 4A-4B may include the upper inner periphery 251 that extends horizontally inward past the top surface 221b of the upper portion 221 (towards the central portion 210), and that also extends downward so as to contact the central portion 210. The upper inner periphery 251 of FIGS. 4A-4B may be loosely folded over itself to provide a rounded upper edge 254. This rounded upper edge 254 may approach and contact the central portion 210. Furthermore, the rounded upper edge 254 may further cause the entire top surface 250b to have a rounded profile. In some examples, this rounded profile may cause a portion of the top surface 250b to extend over the top surface 221b of the upper portion 221 of the gasket 220, without always being in contact with it. This is seen by the gap between the top surface 221b and the top surface 250b in FIG. 4B.

The bottom surface 250c of the lid frame 250 of FIGS. 4A-4B may have a rounded lower edge 252. All or a portion of this rounded lower edge 252 may extend horizontally outward past the external surface 130a in the location of an indentation 131, as is illustrated. By extending past the external surface 130a, the lid frame 250 may have a more comfortable rounded edge that can be used by a user to lift the lid 200 off the container 110. In some examples, this rounded lower edge 252 may cause a portion of the bottom surface 250c to extend over the bottom surface 221c of the upper portion 221 of the gasket 220, without always being in contact with it. This is seen by the gap between the bottom surface 250c and the bottom surface 221c in FIG. 4B. The rounded lower edge 252 may have a depth, D, illustrated in FIG. 4B, that is the same as the depth (or thickness) of the gasket 220 in-between the external edge 221a and the start of the inner groove 222, as is also illustrated in FIG. 4B.

The upper portion 221 of the gasket 220 may be secured within a region that is adjacent to and in-between the rounded lower edge 252 and the rounded upper edge 254. In some examples, the lid frame 250 may stiffen the material of the gasket 220 in the proximity of the lid rim 250, as is discussed above. This may allow the central portion 210 to remain in the inner groove 222 when the lid 200 is lifted, in some examples. Furthermore, it may allow the flexible skirt 224 to be soft and pliable for readily wetting and sealing to the internal surface 130b of the sidewall 130 of the container 110, while the lid frame 250 stiffens the upper portion 221 of the gasket 200.

It should be appreciated that to lift the lid 200 off of the container 110, the user may insert at least one fingertip under the rounded lower edge 252 at the indentation(s) 131. It should also be appreciated that the user may insert at least one fingertip under the rounded lower edge 252 by grasping the lid 200 from above, or by pushing from below the container 110.

Modifications, additions, and/or substitutions may be made to the food storage or cooking vessel 100 of FIGS. 4A-4B without departing from the scope of the specification. For example, although the food storage or cooking vessel 100 is described above as including each of indentation(s) 131, a rounded lower edge 252, and a rounded upper edge 254, in some examples the food storage or cooking vessel 100 may include only indentation(s) 131, only a rounded lower edge 252, only a rounded upper edge 254, only two of the previous three features, or none of the previous three features.

FIGS. 5A-9 illustrate another example of the container 110 and the lid 200 of the food storage or cooking vessel 100. The container 110 of FIGS. 5A-9 may be substantially similar to the container 110 of FIGS. 1A-2, FIGS. 3A-3C, and/or FIGS. 4A-4B. The lid 200 of FIGS. 5A-9 may be substantially similar to the lid 200 of FIGS. 1A-2, FIGS.

3A-3C, and/or FIGS. 4A-4B. However, the central portion 210 of FIGS. 5A-9 may further include one or more valves 300 which may selectively allow air to vent out of the fluid retaining interior region 190 of the container 110 when the lid 200 is sealing the container 110 and the food storage or cooking vessel 100.

The valve(s) 300 may allow the food storage or cooking vessel 100 to be more securely sealed because the venting may prevent air from being trapped and compressed in the fluid retaining interior region 190 during the lid closing process. For example, if the valve 300 is open (i.e., venting air) when the food storage or cooking vessel 100 is being sealed, the lid 200 can be urged downward as air in the container 110 is vented through the valve 300. This may be helpful, as compressed air in the fluid retaining interior region 190 could prevent the food storage or cooking vessel 100 from being sealed at all, or could urge the lid 200 upward and slowly defeat the sealing provide by the gasket 220, in some examples. As such, this venting by the valve(s) 300 may allow the flexible skirt 224 of the gasket 220 to seal with the internal surface 130b of the sidewall 130 (below the rim 140). Also, after the lid 200 is positioned on the container 110, and the food storage or cooking vessel 100 is fully sealed, the valve 300 may then be closed. Furthermore, when the food storage or cooking vessel 100 is heated in a microwave oven with the valve(s) 300 open, the steam and/or hot air generated will gradually vent through the valve(s) 300. This venting of the steam and/or hot air may prevent the lid 200 from being explosively ejected from the top of the container 110.

In some examples, the use of valve(s) 300 in the lid 200 may allow air to be vented even when the gasket 220 does not include any apertures 229. As such, the valve(s) 300 may be included in the food storage or cooking vessel 100 without any apertures 229. In other examples, both the valve(s) 300 and the aperture(s) 229 may be included in the food storage or cooking vessel 100. In some examples, if the lid 200 does not include either aperture(s) 229 or valve(s) 300 (or if the valves 300 are closed), the compression of trapped air may prevent the sealing of the food storage or cooking vessel 100, as the compression of trapped air may resist the full insertion of the flexible skirt 224 below the rim 140 of the container 110. In other examples, the food storage or cooking vessel 100 may still be able to vent some of this air even if the food storage or cooking vessel 100 does not include aperture(s) 229 or valve(s) 300. Furthermore, in other examples, the food storage or cooking vessel 100 may still be able to be properly sealed even if the food storage or cooking vessel 100 does not include aperture(s) 229 or valve(s) 300. As such, the food storage or cooking vessel 100 may not include either aperture(s) 229 or valve(s) 300, in some examples.

As is illustrated, the food storage or cooking vessel 100 of FIGS. 5A-9 includes one or more valves 300. The valve 300 may include any device, element, or unit that may selectively allow air to vent out of the fluid retaining interior region 190 through the central portion 210, and that may also selectively prevent air from venting out of the fluid retaining interior region 190 through the central portion 210. For example, the valve 300 may be a hole and plug combination, a sliding gate valve, a diaphragm or membrane valve, any other device, element, or unit that may selectively allow air to vent out of the fluid retaining interior region 190 through the central portion 210 and that may also selectively prevent air from venting out of the fluid retaining interior region 190 through the central portion 210, or any combination of the preceding. As is illustrated, the valve 300 of FIGS. 5A-9 is a hole and plug combination.

According to the illustrated example, the valve 300 includes a hole 115 in the central portion 210, and a plug 301. The hole 115 may be any opening that extends through the entire thickness of the central portion 210, so that air can pass through the central portion 210 through the hole 115. The hole 115 may have any shape and/or size that allows the valve 300 to selectively allow air to vent out of the fluid retaining interior region 190 through the central portion 210, and also to selectively prevent air from venting out of the fluid retaining interior region 190 through the central portion 210.

The plug 301 may be any device, element, or unit that may selectively plug (or otherwise close) the hole 115. The plug 301 may be made of any material that allows it to selectively plug (or otherwise close) the hole 115, thereby preventing air from passing through the central portion 210. For example, the plug 301 may be made of rubber, a polymer, an elastomer (e.g., silicone, fluorosilicone, etc.), any other material that allows the plug 301 to selectively plug (or otherwise close) the hole 115 (thereby preventing air from passing through the central portion 210), or any combination of the preceding. In a preferable example, the plug 301 is made of a soft resilient deformable material like silicone rubber.

The plug 301 may have any size and/or shape that allows it to selectively plug (or otherwise close) the hole 115. For example, as is illustrated, the plug 301 may have a central portion 302 positioned at least partially within the hole 115, a top portion 303, and bottom portion 304. The top portion 303 may extend outside of the top of the hole 115, and may have dimensions (e.g., width) that are larger than that of the hole 115. A user may push down on this top portion 303 to move the plug 301 downward, and may pull upward on this top portion 303 to move the plug 301 upward. The bottom portion 304 may extend outside of the bottom of the hole 115, and may have dimensions (e.g., width) that are larger than that of the hole 115.

Figure 5A:
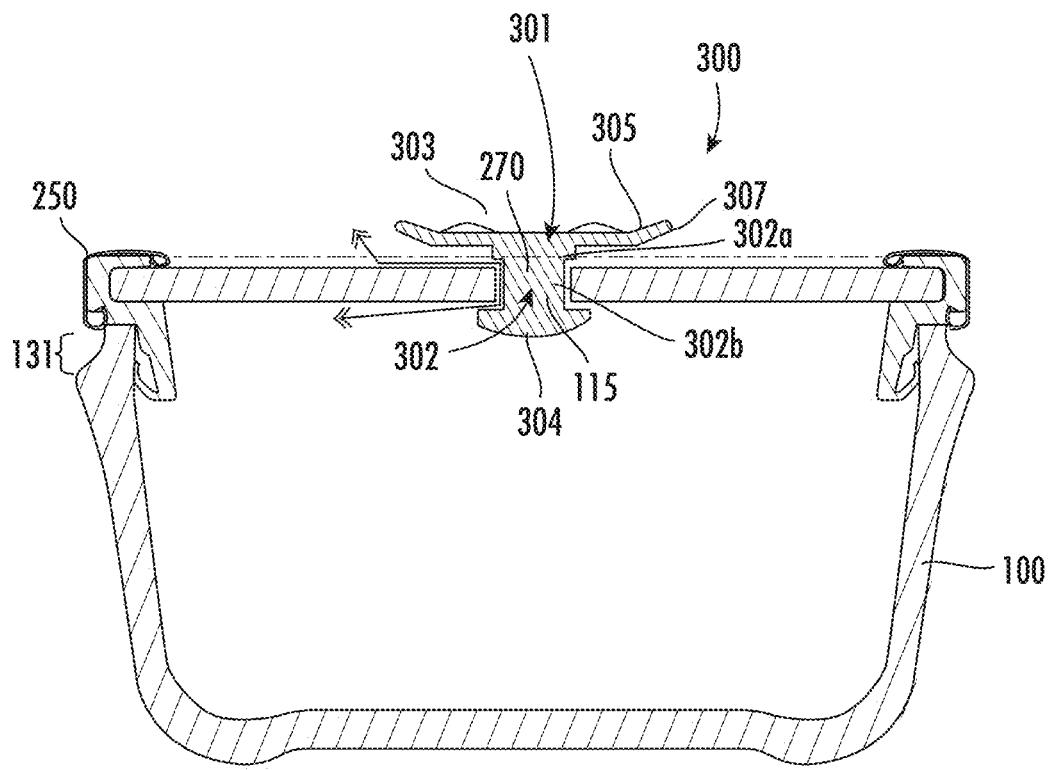
FIG. 5A is a cross-sectional view of another example of the lid and the container of a food storage or cooking vessel, where the lid includes a valve in an open position.
Figure 5B:
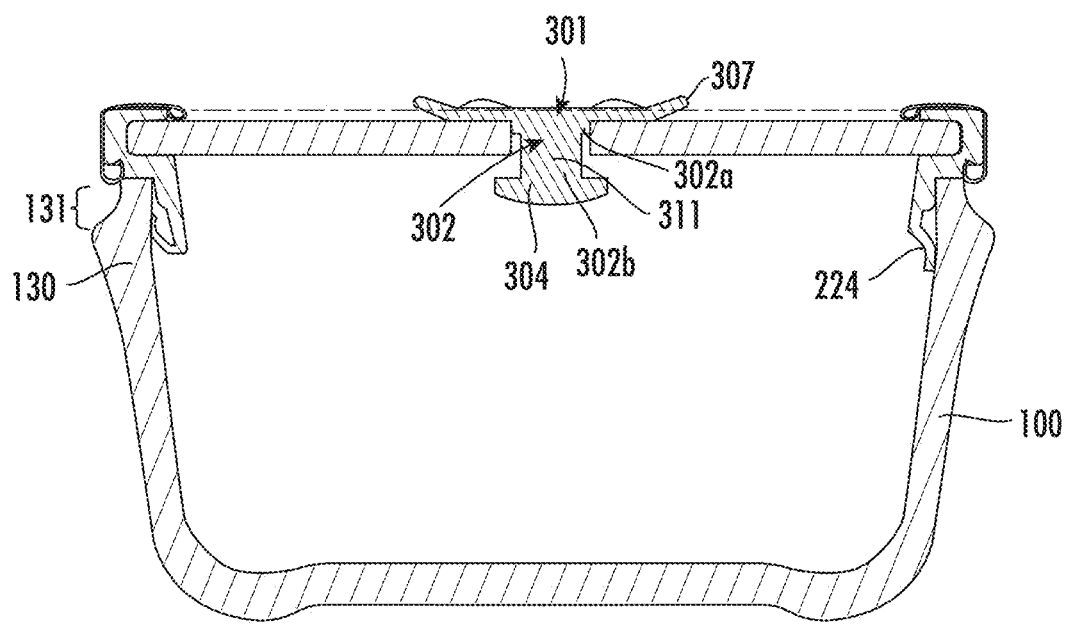
FIG. 5B is a cross-sectional view of the food storage or cooking vessel of FIG. 5A, where the valve is in a closed position.

The central portion 302 may include two regions: a top wide region 302a and a bottom narrow region 302b. The top wide region 302a may have a shape and/or size that is the same (or bigger than) the shape and/or size of the hole 115. As such, when the top wide region 302a is positioned within (or aligned with) the hole 115 (e.g., when the plug 301 is moved downward so that that top wide region 302a is positioned within the sidewalls of the hole 115, as is seen in FIG. 5B), the top wide region 302a may at least substantially close the hole 115, preventing air from passing through the valve 300.

The bottom narrow region 302b may have a shape and/or size that is different than and/or smaller than the shape and/or size of the hole 115. As such, when the bottom narrow region 302b is positioned within (or aligned with) the hole 115 (e.g., when the plug 301 is moved upward so that that bottom narrow region 302b is positioned within the sidewalls of the hole 115, as is seen in FIG. 5A), an air passageway may be provided through the hole 115, as is illustrated in FIG. 5A. As an example of the shape and/or size of the bottom narrow region 302b, the bottom narrow region 302b may not be as wide as the hole 115 (but it may be as vertically thick or thicker than that of the hole 115). As another example, the bottom narrow region 302b may be a different shape as the hole (e.g., the hole 115 may have a circular cross section but the bottom narrow region 302b may have a triangular cross section).

When the valve 300 is open (e.g., when the plug 301 is pulled upward), air and vapor may exit the hole 115, and external air may enter the hole 115 (which may release a vacuum within the fluid retaining interior region 190 of the container 110). Alternatively, when the valve 300 is closed (e.g., when the plug 301 is pushed downward), air and vapor may be prevented from exiting the hole 115, and external air may be prevented from entering the hole 115.

The valve 300 may further include an o-ring to seal and be in threaded engagement with the lid 200 via the perimeter of the hole 115, or an insert therein (which is not shown), in some examples. Furthermore, although the valve 300 is illustrated as being open when the plug 301 is pulled upward, in some examples the valve 300 may be closed when the plug 301 is pulled upward (and may be open when the plug 301 is pushed downward). In such examples, the bottom narrow region 302b may be positioned vertically above the top wide region 302a.

Figure 6:
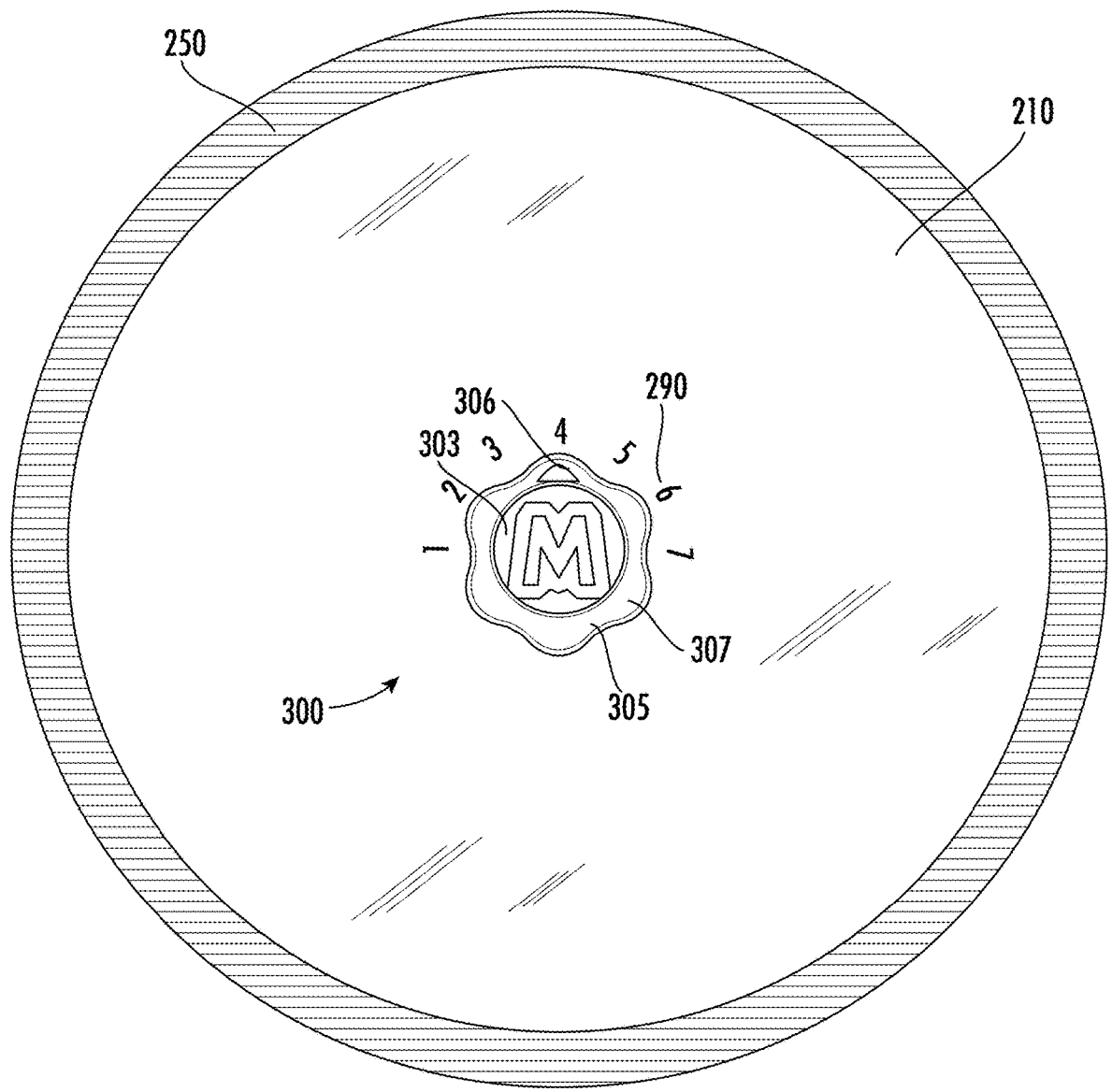
FIG. 6 is a top view of the food storage or cooking vessel of FIG. 5A, showing an example external shape of the valve.

In a preferred example, the valve 300 may further be able to provide one or more indications about the food held and/or stored in the food storage or cooking vessel 100. For example, as is illustrated in FIG. 6, the lid 200 may include one or more markings 290 that indicate an useful date for the food item held and/or stored in the food storage or cooking vessel 100 (e.g., an indication of the date when the food item was placed in the food storage or cooking vessel 100, an indication of when the food item should be disposed of). As is illustrated, the markings 290 may run from 1 to 7 for seven days of the week, but can represent an indication of the weeks of a month, months of a year, or any other indication (e.g., food type, cooking style, etc.).

In the example of FIG. 6, the plug 301 may further include a shape or marking (e.g., a single outward pointing hole 306) that may point to one of the markings 290 on the lid 200. As such, if the outward pointing hole 306 points to the 4, it may indicate that the food item was put in the food storage or cooking vessel 100 on Wednesday (i.e., the 4$^{th}$ day of a week). This outward pointing hole 306 (or other shape or marking) may be rotated (e.g., clockwise, counterclockwise) to any of the markings 290. To do so, the plug 301 may be rotated (by a user) within the hole 115, without venting air. To assist in rotating the plug 301, the plug 301 may have an outer region 305 with an upward curled edge 307 that may be gripped by the user. When the valve 300 is closed, the top portion 303 of the plug 301 may be generally flat in the central portion 210. However, the upward curled edge 307 of the plug 301 may allow the user to easily grab and rotate the plug 301, even when the valve 300 is closed. The plug 301 may have an upward extending portion for gripping, which like the gasket is preferably rubber or elastomer to facilitate gripping to release any vacuum therein, as well as to raise the lid for serving cooked or stored food.

The central portion 210 may include any number of valves 300. For example, the central portion 210 may include 1 valve 300, 2 valves 300, 3 valves 300, 4 valves 300, any other number of valves 300, or any number of valves 300 (or range of valves 300) in-between 1 valve 300 and 4 valves 300. Furthermore, the valve(s) 300 may be positioned in any location in the central portion 210. For example, the valve 300 may be positioned in the center of the central portion 210, off-center in the central portion 210, in a corner of the central portion 210, any other location in the central portion 210, or any combination of the preceding. As is illustrated, the central portion 210 of FIGS. 5A-9 includes a single valve 300 positioned in the center of the central portion 210.

In some examples, if the food item is already heated when it is positioned in the container 110 (e.g., for storage), the hot food item may generate steam and air that is expelled out of open valve(s) 300. Furthermore, if the valve(s) 300 are closed, cooling of the hot food item in the container 110 (e.g., cooling in the refrigerator) may condense steam that is trapped in the food storage or cooking vessel 100. This condensation may result in a vacuum within the container 110, which may hold the lid 200 in place with greater force than just the frictional engagement of the gasket 220 and flexible skirt 224 with the container 110. This manner of providing a vacuum in the container 110 may provide additional advantages, such as by providing protection of the food item therein from spilling (even if the container is inverted), improved storage life by excluding bacteria, and the avoidance of the transfer of food item odors to the refrigerator. Unfortunately, this manner of providing a vacuum could also cause issues, in some examples. For example, because atmospheric pressure on the lid 200 increases as the lid size increases, providing such a vacuum within a large vessel (having a large lid size) may also require a reinforced lid or a thicker lid (or a limitation on the diameter of the lid).

The gasket 220 of the food storage or cooking vessel of FIGS. 5A-9 (and/or of FIGS. 1A-2, FIGS. 3A-3C, and/or FIGS. 4A-4B), however, may provide self-venting that may address this deficiency, in some examples. This self-venting may prevent the formation of too much of a vacuum within the container 110 (which may be problematic, as is discussed above). Furthermore, after the self-venting occurs, the valve 300 may be re-opened, the lid 100 may be removed and re-inserted (or just re-inserted), and the valve 300 may then be closed to maintain the lid 200 in the closed position.

To provide this self-venting, the flexible skirt 224 may be further configured so that at least a portion of the flexible skirt 224 may flex (or otherwise move) downward as a result of inside and outside pressure. This flexibility may cause this portion of the flexible skirt 224 to deform downwards, as is illustrated in FIGS. 7A-7C and 8. For example, when a vacuum forms in the container 110 (e.g., due to the cooling of a heated food item in the sealed food storage or cooking vessel 100, as is discussed above), the higher atmospheric pressure outside of the food storage or cooking vessel 100 may cause a portion of a perimeter of the flexible skirt 224 to deform by flipping orientation and curling downward. This downward deformation may cause the outward facing portion 224a of the flexible skirt 224 to flip down and face inward, while causing the inward facing portion 224b of the flexible skirt 224 to flip down and face outward, as is seen in FIGS. 7A-7C and 8. During this downward deformation, a small amount of air may enter the container 110 through a gap created by the downward deformation, for example. This movement of a small amount of air into the container 110 is referred to as self-venting. The self-venting may prevent a full vacuum from forming in the container 110. In some examples, this self-venting may prevent the need for a reinforced lid or a thicker lid on larger containers 110 (or may prevent a limitation on the diameter of the lid).

Figure 7A:
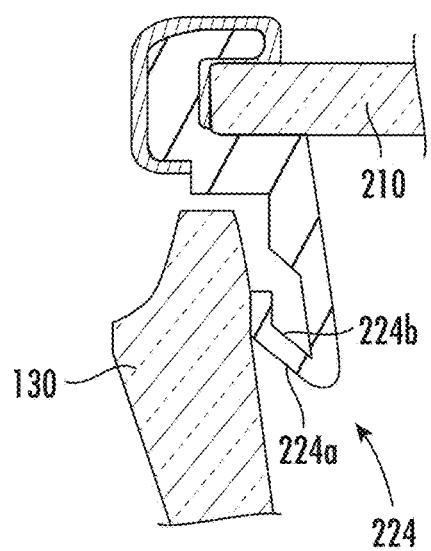
FIGS. 7A-7C are enlarged cross-sectional views of the left corner of the food storage or cooking vessel of FIG. 5A.
Figure 7B:
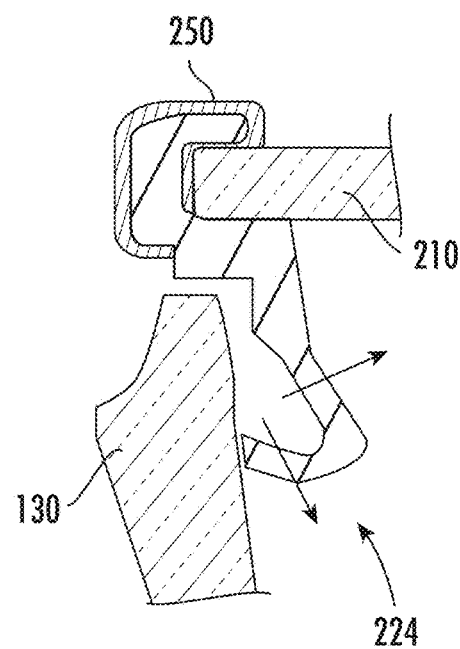
Figure 7C:
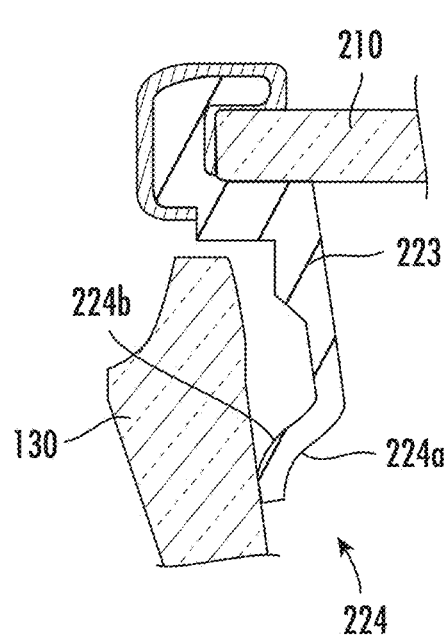
Figure 8:
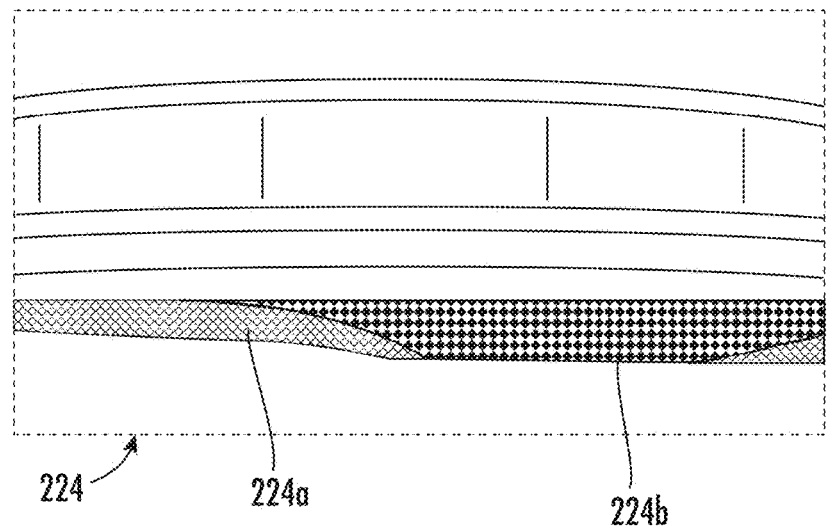
FIG. 8 is a cross-sectional view of a portion of the food storage or cooking vessel of FIG. 5A, showing an example downward deformation of the flexible skirt of the lid.

The flexible skirt 224 may provide this self-venting even though it may be slightly curved upward in its un-deformed state (as is illustrated in FIG. 7A, and also discussed above), and further even though it may also curl upwards into an upward deformed state when it contacts the internal surface 130b of the sidewall 130 (as is illustrated in FIG. 7A, and also discussed above). In such examples, the higher atmospheric pressure outside of the food storage or cooking vessel 100 (when the container 110 has developed a vacuum) may still cause a portion of a perimeter of the flexible skirt 224 to deform by flipping orientation and curling downward, for example.

The flexible skirt 224 may be configured in any way so as to allow the portion of a perimeter of the flexible skirt 224 to deform by flipping orientation and curling downward. For example, the flexible skirt 224 may have any thickness (or other dimension) that allows such a downward deformation. As another example, the material of the gasket 220 and the flexible skirt 224 (e.g., a rubber, a polymer, an elastomer, as is discussed above) may allow (or contribute to allowing) such downward deformation.

The portion of the perimeter of the flexible skirt 224 that deforms downward may be any portion of the perimeter of the flexible skirt 224. For example, it may only be a small portion of the perimeter of the flexible skirt 224, or it may be the entire perimeter of the flexible skirt 224. Additionally, the portion of the flexible skirt 224 may deform downward at any pressure differential where the outside pressure exceeds that pressure inside of the food storage or cooking vessel 100.

Figure 9:
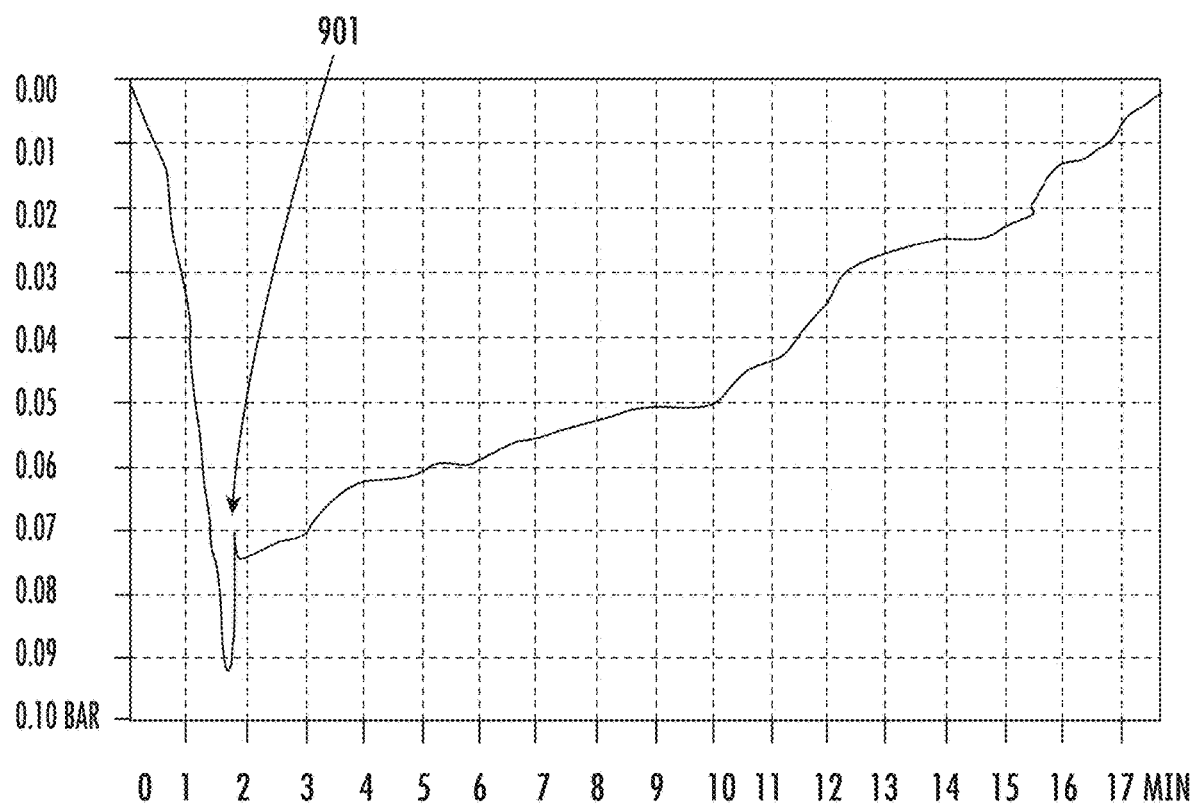
FIG. 9 is a graph of the observed pressure change over time when hot water in the food storage or cooking vessel of FIG. 5A is cooled with the valve closed.

Furthermore, although the portion of the perimeter of the flexible skirt 224 may deform downward, the remaining portion of the perimeter of the flexible skirt 224 may not. As such, the remaining portion of the perimeter of the flexible skirt 224 may remain in constant or near constant contact with the internal surface 130b of the sidewall 130 (e.g., due to the compliancy of the flexible skirt 224). This means that the downward deformed portion may be bounded (i.e., providing a boundary) on both sides by a remaining portion that is in constant or near constant contact with the internal surface 130b of the sidewall 130. This may provide a slow decrease in vacuum level as is illustrated in FIG. 9, which shows the measured change in pressure over time as near boiling water cools to about 50° C. As is seen, the pressure differential (between the outside pressure and the pressure in the food storage or cooking vessel 100 with the valve 300 closed and the gasket 200 sealing the lid 200 to the internal surface 130b of the sidewall 130) may increase by approximately 0.09 bars within less than 2 minutes, as the steam that has displaced air in the food storage or cooking vessel 100 condenses and drops the internal pressure. However, as indicated by the time axis placement of arrow 901, there is an initial almost instantaneous decrease of the pressure differential as the external pressure causes downward deformation of the flexible skirt 224, causing it to flip so that the inward facing portion 224b is in contact with the internal surface 130b of the sidewall 130 (instead of the outward facing portion 224a). Thereafter, the small non-contacting regions of the flexible skirt 224 surrounding the downward deformed portion may cause a slow leak of air so that the food storage or cooking vessel 100 is back at atmospheric pressure in about 15 minutes.

Modifications, additions, and/or substitutions may be made to the food storage or cooking vessel 100 of FIGS. 5A-9 without departing from the scope of the specification. For example, although the food storage or cooking vessel 100 is described above as including each of valve(s) 300, marking(s) 290, and a self-venting flexible skirt 224, in some examples the food storage or cooking vessel 100 may include only valve(s) 300, only marking(s) 290, only a self-venting flexible skirt 224, only two of the previous three features, or none of the previous three features.

FIGS. 10A-10D illustrate additional examples of gasket 220 of the food storage or cooking vessel 100. The gaskets 220 of FIGS. 10A-10D may be substantially similar to the gaskets 220 of FIGS. 1A-2, FIGS. 3A-3C, FIGS. 4A-4C, and/or FIGS. 5A-9. However, the gaskets 220 of FIGS. 10A-10D may have a different shape. For example, the flexible skirt 224 of the gasket 220 of FIG. 10A may include a rounded tip (as opposed to a flat tip). This rounded tip may allow the flexible skirt 224 to more easily deform downward, and may also allow the flexible skirt 224 to more easily flip back from the downward deformation after the pressure differential (between the outside pressure and the pressure inside the food storage or cooking vessel 100) decreases. This may allow the gasket 220 to further seal the food storage or cooking vessel 100 following the decrease in pressure differential.

Figure 10A:
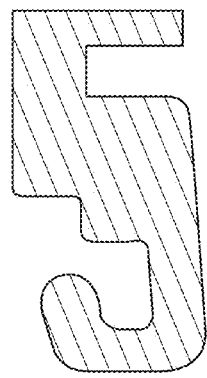
FIGS. 10A-10D are cross-sectional views of other examples of gaskets.
Figure 10B:
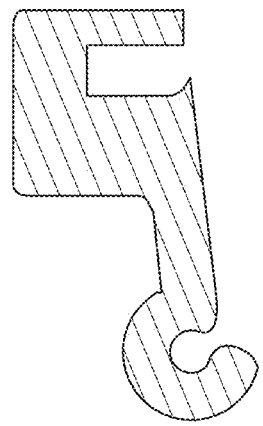
Figure 10C:
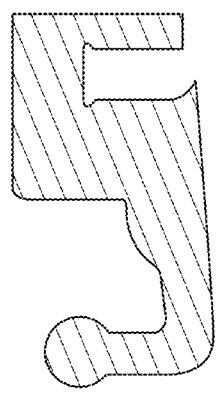
Figure 10D:
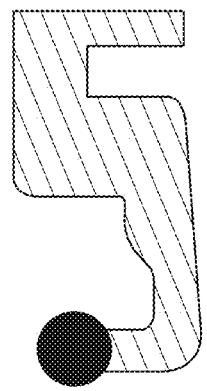

As another example, the flexible skirt 224 of FIG. 10B may have a downward curvature in its un-deformed state (as opposed to the upward curvature seen in FIGS. 1A-9). As a further example, the flexible skirt 224 of FIG. 10C may not have a curvature at all. Instead, it may extend outward horizontally or substantially horizontally. It may also include a rounded tip. As another example, the flexible skirt 224 of FIG. 10D may extend outward horizontally or substantially horizontally, and my further have a large rounded tip.

Modifications, additions, and/or substitutions may be made to the food storage or cooking vessel (or any of the components of the food storage or cooking vessel) of each of FIGS. 1A-10D without departing from the scope of the specification. For example, any of the food storage or cooking vessels (or any of the components of the food storage or cooking vessel) of any of FIGS. 1A-10D may be combined with or replaced with any of the other food storage or cooking vessels (or any of the components of the food storage or cooking vessels) of any of the other FIGS. 1A-10D. For example, the gasket 220 of FIG. 5A may be replaced with the gasket 220 of FIG. 10A or the gasket 220 of FIG. 10C.

The vessel 100 of FIGS. 1A-10D may be used for both storing and cooking foods. Foods can be cooked in a microwave oven with the lid 200 in place, and briefly finished in a conventional or convection oven to brown the food after the lid 200 is removed.

The use of a metal annular lid rim 250 reinforces a soft rubber gasket 220 to prevent the vacuum from the cooling of food from pulling or displacing the container lid 200 from the container rim 140. The gasket 220 however provides the option of storing food under vacuum in a refrigerator or freezer.

It has also been discovered that the metal annular lid rim 250 does not get excessively hot from microwave cooking, as it appears to reflect microwave energy, and though the internal portion of the lid 200 and container sidewall 130 are heated from the food and steam generated in cooking, a rubber gasket 220, being a good thermal insulator, relative to glass, prevents transfer of the heat to the metal annular lid rim 250.

As such, the lid 200 can be left in place when food is brought to the table for serving. As the gasket 220 prevents the leakage of hot air and steam, food will remain hot for at least 30 minutes, and depending on the initial temperature, substantially warm for 45 minutes or longer. These benefits are achieved when the lid 200 is about 4 mm thick and the container sidewall 130 is about 5 mm thick. Glass within this range of thickness aids in retaining heat, but still does not heat the metal lid rim 250 or the handle or grip portion of the valve 300. Hence, food can be served directly from the table by lifting the lid 200 at the time of a meal, without a concern the lid edge, or metal, or the grip being too hot, but the food will have remained very warm.

It should be appreciated that when the flexible skirt 224 and sidewall 130 are shaped to promote a large area of mutual contact at the inner surface 130b, such contacting area may provide friction that resists the unintended removal of the lid 200 from the container 110 in the absence of a vacuum in cavity 190. However, too large a contact area would reduce the ability of the gasket outward facing portion 224a to flip (so that it faces inward) as illustrated in FIG. 7A-C and FIG. 8. It has been discovered that it is preferable that between 5 to 60% (and more preferably between 10 to 50%) of the surface area (or the arcuate length) of the outward facing portion 224a should make contact with the internal surface 130b of the sidewall 130 of the container 110 to provide sufficient friction to resist the lid 200 being easily displaced (which could cause the contents to leak), but still be capable of flipping to preclude an excess vacuum level (i.e., to self-vent). An example of this 5 to 60% of the surface area (or the arcuate length) of the outward facing portion 224a in contact with the internal surface 130b is shown in FIG. 7A.

The grammatical articles "one", "a", "an", and "the", as used in this specification, are intended to include "at least one" or "one or more", unless otherwise indicated. Thus, the articles are used in this specification to refer to one, or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A vessel for one of cooking and storing one or more food items, comprising:
   a) a container having a bottom and an upward extending sidewall that terminates in a rim that defines an upper opening of the container, the upward extending sidewall having an external surface that defines a horizontally outermost portion of the sidewall, the upward extending sidewall further having an internal surface that defines a horizontally innermost portion of the sidewall;
   b) a removable lid for the container, the lid comprising:
      i) a central portion having an outer peripheral region;
      ii) an annular gasket positioned to surround a perimeter of the central portion, the annular gasket comprising:
         (1) an upper portion coupling the gasket to the central portion, the upper portion including an inner groove for receiving the outer peripheral region of the central portion, wherein the outer peripheral region of the central portion is positioned within the inner groove of the upper portion;
         (2) a vertical portion descending downward from the upper portion of the gasket, the vertical portion having an outer side that is positioned horizontally inward from an external edge of the upper portion of the gasket; and
         (3) a flexible skirt extending horizontally outward from the outer side of the vertical portion of the gasket, wherein the flexible skirt terminates in a rounded portion that is configured to be in contact with the internal surface of the sidewall of the container when the lid is positioned on the rim of the container, wherein the flexible skirt has an upward curvature in an un-deformed state, wherein the flexible skirt is further configured to deform upward and inward from the un-deformed state when the lid is positioned on the rim of the container so as to seal the vessel, and wherein the flexible skirt is further configured to release the rounded portion from contact with the internal surface of the sidewall when the pressure inside of the vessel is reduced to form a vacuum and reseal with the internal surface of the sidewall when the vacuum level has been partially reduced such that the atmospheric pressure outside the vessel remains greater than the pressure inside of the vessel;
      iii) an annular lid rim positioned to surround a perimeter of the upper portion of the gasket, the annular lid rim applying pressure to one or more portions of the upper portion of the gasket, wherein the annular lid rim has an external edge that extends horizontally outward past at least the internal surface of the sidewall while the vessel is sealed by the lid so as to prevent the annular lid rim from being vertically displaced below the rim;
   c) wherein the central portion of the lid has one or more valves configured to selectively allow air to vent out of a fluid retaining interior region of the container while the vessel is sealed by the lid; and
   d) wherein the vessel is configured to be heated in a microwave oven while the vessel is sealed by the lid.

2. A vessel for one of cooking and storing one or more food items, comprising:
   a) a container having a bottom and an upward extending sidewall that terminates in a rim that defines an upper opening of the container, the upward extending sidewall having an external surface and an internal surface; and
   b) a removable lid for the container, the lid comprising:
      i) a central portion having an outer peripheral region;
      ii) an annular gasket positioned to surround a perimeter of the central portion, the annular gasket comprising:
         (1) an upper portion coupling the gasket to the central portion;
         (2) a vertical portion descending downward from the upper portion of the gasket, the vertical portion having an outer side that is positioned horizontally inward from an external edge of the upper portion of the gasket; and (3) a flexible skirt extending horizontally outward from the outer side of the vertical portion of the gasket, wherein the flexible skirt terminates in a rounded portion that is configured to be in contact with the internal surface of the sidewall of the container when the lid is positioned on the rim of the container, wherein the flexible skirt is further configured to deform upward and inward from an un-deformed state when the lid is positioned on the rim of the container so as to seal the vessel, and wherein the flexible skirt is further configured to release the rounded portion from contact with the internal surface of the sidewall when the pressure inside of the vessel is reduced to form a vacuum and reseal with the internal surface of the sidewall when the vacuum level has been partially reduced such that the atmospheric pressure outside the vessel remains greater than the pressure inside of the vessel;

iii) an annular lid rim positioned to surround a perimeter of the upper portion of the gasket, wherein the annular lid rim has an external edge that extends horizontally outward past at least the internal surface of the sidewall while the vessel is sealed by the lid so as to prevent the annular lid rim from being vertically displaced below the rim.

3. The vessel according to claim 2, wherein the vessel is configured to be heated in a microwave oven while the vessel is sealed by the lid.

4. The vessel according to claim 2, wherein the flexible skirt has an upward curvature in the un-deformed state.

5. The vessel according to claim 2, wherein the central portion of the lid has one or more valves configured to selectively allow air to vent out of a fluid retaining interior region of the container while the vessel is sealed by the lid.

6. The vessel according to claim 2, wherein a portion of the annular gasket is positioned vertically above the rim of the container while the vessel is sealed by the lid.

7. The vessel according to claim 2, wherein the external edge of the annular lid rim extends horizontally outward past the external surface of the sidewall when the lid is positioned on the rim of the container.

8. The vessel according to claim 2, wherein the external edge of the upper portion of the gasket extends horizontally outward past the external surface of the sidewall when the lid is positioned on the rim of the container.

9. The vessel according to claim 2, wherein the annular lid rim is made of metal.

10. The vessel according to claim 2, wherein the container and the central portion of the lid are both made of glass.

11. The vessel according to claim 2, wherein the upper portion of the gasket includes an inner groove for receiving the outer peripheral region of the central portion, wherein the outer peripheral region of the central portion is positioned within the inner groove of the upper portion.

12. The vessel according to claim 11, wherein the annular lid rim applies pressure to opposing sides of the external edge of the upper portion of the gasket so as to urge the outer peripheral region of the central portion further into position within the inner groove of the upper portion.

13. The vessel according to claim 2, wherein the annular lid rim is configured to stiffen a portion of the upper portion of the gasket.

14. The vessel according to claim 2, wherein the container has one or more indentations in the external surface of the sidewall of the container, wherein the one or more indentations extend upward to the rim of the container.

15. The vessel according to claim 14, wherein the one or more indentations comprises a single indentation that extends around the entire perimeter of the external surface of the sidewall of the container.

16. The vessel according to claim 2, wherein the annular lid rim has a bottom surface with a rounded lower edge, wherein at least a portion of the rounded lower edge extends horizontally outward past the external surface of the sidewall in a location of an indentation within the external surface.

17. The vessel according to claim 2, wherein the gasket has one or more bumpers positioned on at least the outer side of the vertical portion of the gasket, wherein the one or more bumpers each have a horizontally outermost surface that is positioned inward from the external edge of the upper portion of the gasket.

18. The vessel according to claim 2, wherein the annular lid rim is made of metal and the gasket is made of a rubber or an elastomer.

19. The vessel according to claim 2, wherein the flexible skirt has an outward facing portion and an inward facing portion, wherein the flexible skirt is configured to have 5-60% of the surface area of the outward facing portion in contact with the internal surface of the sidewall when the lid is positioned on the rim of the container.

20. The vessel according to claim 19, wherein the flexible skirt is further configured to have 10-50% of the surface area of the outward facing portion in contact with the internal surface of the sidewall when the lid is positioned on the rim of the container.

21. A removable lid for a container of a vessel, comprising:

a) a central portion having an outer peripheral region;

b) an annular gasket positioned to surround a perimeter of the central portion, the annular gasket comprising:

i) an upper portion coupling the gasket to the central portion, the upper portion having an inner groove for receiving the outer peripheral region of the central portion, wherein the outer peripheral region of the central portion is positioned within the inner groove of the upper portion;

ii) a vertical portion descending downward from the upper portion of the gasket, the vertical portion having an outer side that is positioned horizontally inward from an external edge of the upper portion of the gasket;

iii) a flexible skirt extending horizontally outward from the outer side of the vertical portion of the gasket, wherein the flexible skirt terminates in a rounded portion that is configured to be in contact with an internal surface of a sidewall of the container when the lid is positioned on a rim of the container, wherein the flexible skirt is further configured to deform upward and inward from an un-deformed state when the lid is positioned on the rim of the container so as to seal the vessel, and wherein the flexible skirt is further configured to release the rounded portion from contact with the internal surface of the sidewall when the pressure inside of the vessel is reduced to form a vacuum and reseal with the internal surface of the sidewall when the vacuum level has been partially reduced such that the atmospheric pressure outside the vessel remains greater than the pressure inside of the vessel; and iv) an annular lid rim positioned to surround a perimeter of the upper portion of the gasket, wherein the annular lid rim has an external edge that extends horizontally outward past at least the internal surface of the sidewall while the vessel is sealed by the lid so as to prevent the annular lid rim from being vertically displaced below the rim.

22. A method, comprising:
a) positioning a vessel within an interior of a microwave oven, wherein the vessel is for one of cooking and storing one or more food items, the vessel comprising:
   i) a container having a bottom and an upward extending sidewall that terminates in a rim that defines an upper opening of the container, the upward extending sidewall having an external surface and an internal surface;
   ii) a removable lid positioned on the lid of the container, the lid comprising:
      (1) a central portion having an outer peripheral region;
      (2) an annular gasket positioned to surround a perimeter of the central portion, the annular gasket comprising:
         a. an upper portion coupling the gasket to the central portion;
         b. a vertical portion descending downward from the upper portion of the gasket, the vertical portion having an outer side that is positioned horizontally inward from an external edge of the upper portion of the gasket; and
         c. a flexible skirt extending horizontally outward from the outer side of the vertical portion of the gasket, wherein the flexible skirt terminates in a rounded portion that is in contact with the internal surface of the sidewall of the container while the lid is positioned on the rim of the container, wherein the flexible skirt has an upward curvature in an un-deformed state, wherein the flexible skirt is deformed upward and inward from the un-deformed state when the lid is positioned on the rim of the container so as to seal the vessel, and wherein the flexible skirt is further configured to release the rounded portion from contact with the internal surface of the sidewall when the pressure inside of the vessel is reduced to form a vacuum and reseal with the internal surface of the sidewall when the vacuum level has been partially reduced such that the atmospheric pressure outside the vessel remains greater than the pressure inside of the vessel; and
      (3) an annular lid rim positioned to surround a perimeter of the upper portion of the gasket, the annular lid rim applying pressure to one or more portions of the upper portion of the gasket, wherein the annular lid rim has an external edge that extends horizontally outward past at least the internal surface of the sidewall while the vessel is sealed by the lid so as to prevent the annular lid rim from being vertically displaced below the rim; and
b) activating the microwave oven while the vessel is positioned within the interior of the microwave oven and further while the vessel is sealed by the lid.

23. The method according to claim 22, further comprising opening one or more valves positioned in the central portion of the lid prior to positioning the vessel within the interior of the microwave oven.

24. A vessel for one of cooking and storing one or more food items, comprising:
a) a container having a bottom and an upward extending sidewall that terminates in a rim that defines an upper opening of the container, the upward extending sidewall having an external surface and an internal surface; and
b) a removable lid for the container, the lid comprising:
   i) a central portion having an outer peripheral region;
   ii) an annular gasket positioned to surround a perimeter of the central portion, the annular gasket comprising:
      (1) an upper portion coupling the gasket to the central portion;
      (2) a vertical portion descending downward from the upper portion of the gasket, the vertical portion having an outer side that is positioned horizontally inward from an external edge of the upper portion of the gasket; and
      (3) a flexible skirt extending horizontally outward from the outer side of the vertical portion of the gasket, wherein the flexible skirt is configured to be in contact with the internal surface of the sidewall of the container when the lid is positioned on the rim of the container, wherein the flexible skirt is further configured to deform upward and inward from an un-deformed state when the lid is positioned on the rim of the container so as to seal the vessel, wherein the flexible skirt further includes one or more perforations configured to allow air to vent out of a fluid retaining interior region of the container while the vessel is sealed by the lid;
   iii) an annular lid rim positioned to surround a perimeter of the upper portion of the gasket, wherein the annular lid rim has an external edge that extends horizontally outward past at least the internal surface of the sidewall while the vessel is sealed by the lid so as to prevent the annular lid rim from being vertically displaced below the rim.

* * * * *